US010928235B2

(12) United States Patent
Shea-Simonds et al.

(10) Patent No.: US 10,928,235 B2
(45) Date of Patent: Feb. 23, 2021

(54) APPARATUS FOR DISPENSING A FLOWABLE PRODUCT

(71) Applicant: HODGES & DRAKE DESIGN LIMITED, Leicester (GB)

(72) Inventors: Duncan Shea-Simonds, Leicester (GB); Laurence Arc, Leicester (GB); Kevin Hodges, Leicester (GB)

(73) Assignee: HODGES & DRAKE DESIGN LIMITED, Leicester (GB)

( * ) Notice: Subject to any disclaimer, the term of this patent is extended or adjusted under 35 U.S.C. 154(b) by 0 days.

(21) Appl. No.: 16/491,403

(22) PCT Filed: Mar. 5, 2018

(86) PCT No.: PCT/GB2018/050551
§ 371 (c)(1),
(2) Date: Sep. 5, 2019

(87) PCT Pub. No.: WO2018/162883
PCT Pub. Date: Sep. 13, 2018

(65) Prior Publication Data
US 2020/0018629 A1 Jan. 16, 2020

(30) Foreign Application Priority Data
Mar. 6, 2017 (GB) .................................... 1703549

(51) Int. Cl.
*G01F 11/02* (2006.01)
*B65D 83/00* (2006.01)
*G01F 11/12* (2006.01)

(52) U.S. Cl.
CPC ........ *G01F 11/029* (2013.01); *B65D 83/0005* (2013.01); *B65D 83/0055* (2013.01); *G01F 11/125* (2013.01); *B65D 2231/001* (2013.01)

(58) Field of Classification Search
CPC . G01F 11/029; G01F 11/125; B65D 83/0005; B65D 83/0055
(Continued)

(56) References Cited

U.S. PATENT DOCUMENTS 3,637,116 A * 1/1972 Rutherford ............... B65B 3/32
222/309
3,981,414 A * 9/1976 Gust ...................... B67D 1/103
222/38
(Continued)

FOREIGN PATENT DOCUMENTS

EP 0788831 A2 8/1997
WO WO98/38480 A1 9/1998

OTHER PUBLICATIONS

Hodges & Drake Design Limited; International Patent Application No: PCT/GB2018/050551; International Search Report; dated Jun. 6, 2018; (2 pages).
(Continued)

*Primary Examiner* — Michael J. Melaragno
(74) *Attorney, Agent, or Firm* — Dority & Manning, P.A.

(57) ABSTRACT

An apparatus (10) is provided for dispensing a flowable product from a collapsible container (12) comprising an air-tight cavity (14) and an opening (16). The apparatus (10) includes a reservoir (18) comprising a chamber (20) for storing flowable product, the chamber (20) comprising a product inlet (22) for receiving flowable product delivered from the air-tight cavity (14) of a connected collapsible container (12) through the opening (16) thereof, and a product outlet (24) for the flowable product. A piston (46) is positioned inside the chamber (30) and is movable to vary the volume of the chamber (30), for example between a first position defining a maximum chamber volume and a second position defining a minimum chamber volume.

19 Claims, 13 Drawing Sheets

(58) Field of Classification Search
USPC .......................................................... 222/252
See application file for complete search history.

(56) References Cited

U.S. PATENT DOCUMENTS

| | | | |
|---|---|---|---|
| 4,027,785 A | 6/1977 | Edstrom | |
| 5,052,591 A * | 10/1991 | Divall | B65B 3/326 222/135 |
| 5,067,531 A * | 11/1991 | Herzog | B65B 3/32 141/116 |
| 5,086,403 A * | 2/1992 | Slocum | G01M 3/2892 222/52 |
| 5,158,748 A * | 10/1992 | Obi | G01N 1/38 222/320 |
| 5,199,604 A * | 4/1993 | Palmer | A61M 3/0233 222/25 |
| 5,356,041 A | 10/1994 | Hellenberg | |
| 5,485,812 A * | 1/1996 | Firey | F02B 45/00 110/108 |
| 5,975,374 A * | 11/1999 | Vargas | G01F 11/021 222/252 |
| 6,236,048 B1 | 5/2001 | Ditmarsen | G01N 15/02 250/339.12 |
| 6,820,763 B2 * | 11/2004 | Bilskie | B67D 1/0406 222/105 |
| 2003/0047202 A1 * | 3/2003 | Worm | B08B 7/0021 134/157 |
| 2003/0072652 A1 * | 4/2003 | Danby | F04B 43/06 417/53 |
| 2004/0159676 A1 | 8/2004 | Adema | |
| 2005/0150911 A1 * | 7/2005 | Bach | B67D 1/10 222/209 |
| 2005/0224523 A1 * | 10/2005 | O'Dougherty | B67D 7/0261 222/399 |
| 2009/0314798 A1 * | 12/2009 | Hovinen | G01F 23/18 222/23 |
| 2012/0048880 A1 | 3/2012 | Damolaris | |
| 2013/0099929 A1 * | 4/2013 | Ophardt | A47K 5/1217 340/573.1 |
| 2014/0196221 A1 | 7/2014 | D'Amico | |
| 2015/0050719 A1 * | 2/2015 | Bammesberger | G01N 35/1016 435/286.5 |
| 2015/0289704 A1 | 10/2015 | Hengesbach | |
| 2016/0213125 A1 | 7/2016 | D'Amico | |
| 2016/0289058 A1 * | 10/2016 | Foster | B67D 1/108 |
| 2017/0190558 A1 * | 7/2017 | Ubidia | G05D 7/0682 |
| 2017/0321686 A1 * | 11/2017 | Hodges | F04B 43/1261 |
| 2018/0117255 A1 * | 5/2018 | Weikart | C23C 16/402 |
| 2019/0256339 A1 * | 8/2019 | Cleland | B23P 15/001 |
| 2019/0344233 A1 * | 11/2019 | Savino | B01F 15/065 |
| 2020/0064873 A1 * | 2/2020 | Beavis | G05D 7/0635 |
| 2020/0073417 A1 * | 3/2020 | Tatera | B67D 1/0031 |
| 2020/0078751 A1 * | 3/2020 | Schuster | B01F 15/0247 |
| 2020/0088750 A1 * | 3/2020 | Reinhardt | G01N 35/00029 |

OTHER PUBLICATIONS

Hodges & Drake Design Limited; GB Patent Application No: GB1703549.4; Search Report; dated Aug. 29, 2017; (2 pages).
Hodges & Drake Design Limited; GB Patent Application No: GB1803498.3; Search Report; dated Sep. 1, 2018; (1 page).

* cited by examiner

APPARATUS FOR DISPENSING A FLOWABLE PRODUCT

This application is a National Stage Patent Application of PCT/GB2018/050551, filed on Mar. 5, 2018, which claims the benefit of priority to Great Britain Patent Application No. 1703549.4, filed on Mar. 6, 2017, the disclosures of all of which are incorporated by reference herein in their entireties.

TECHNICAL FIELD

The present disclosure relates generally to an apparatus for dispensing a flowable product. More particularly, the present disclosure relates to an apparatus for dispensing a flowable product from an air-tight cavity of a collapsible container connected to the apparatus.

TECHNICAL BACKGROUND

Automated dispensing apparatus are used in a wide variety of applications to enable accurate quantities of flowable products to dispensed and mixed together. One such application is in the dispensing of hair colourings and an example of an automatic dispensing apparatus for hair colourings is described in US 2012/0048880 A1.

Difficulties can, however, arise with known automated dispensing apparatus when the supply of one or more of the flowable products is depleted. There is, therefore, a need for an improved apparatus for dispensing a flowable product.

SUMMARY OF THE DISCLOSURE

According to a first aspect of the present disclosure, there is provided an apparatus for dispensing a flowable product from a collapsible container comprising an air-tight cavity and an opening, the apparatus comprising:
- a reservoir comprising a chamber for storing flowable product, the chamber comprising: a product inlet for receiving flowable product delivered from the air-tight cavity of a connected collapsible container through the opening thereof; and a product outlet for the flowable product; and
- a piston positioned inside the chamber which is movable to vary the volume of the chamber.

The piston may be movable between a first position defining a maximum chamber volume and a second position defining a minimum chamber volume.

Flowable product is delivered from the air-tight cavity of a connected collapsible container into the chamber and is stored in the chamber. When the piston is in the first position, defining the maximum chamber volume, the chamber contains a known predetermined volume of flowable product that is available for dispensing. When the piston is in the second position defining the minimum chamber volume, the chamber may be substantially empty and substantially devoid of all flowable product.

The apparatus may comprise a control unit.

The control unit may be arranged to monitor a characteristic associated with the movement of the piston and may be arranged to recognise when the monitored characteristic indicates that flowable product is not available for delivery to the chamber from the air-tight cavity of a connected collapsible container. The control unit may be arranged to generate an alert upon recognising that the monitored characteristic indicates that flowable product is not available for delivery to the chamber from the air-tight cavity of a connected collapsible container. The alert could, for example, be a visual and/or an audible alert.

Movement of the piston in the chamber between the first and second positions is affected by the availability of flowable product for delivery to the chamber from a connected collapsible container. In particular, because the flowable product is contained in an air-tight cavity within a connected collapsible container, when the supply of flowable product inside the air-tight cavity is fully depleted and an attempt is made to withdraw flowable product from the air-tight cavity, a vacuum is created (in other words the chamber is pressurised) which affects the movement of the piston in the chamber. Accordingly, by arranging the control unit to monitor a characteristic associated with the movement of the piston, the movement can be used to provide an indication that the supply of flowable product in a connected collapsible container is fully depleted and the resulting alert generated by the control unit can prompt a user to connect a replacement collapsible container which contains a further supply of flowable product.

The apparatus may comprise a transducer, for example a limit switch or a micro switch, which may be arranged to detect when the piston is in the first position. The control unit may be arranged to monitor the movement of the piston based on a detection signal received by the control unit from the transducer. The detection signal may be indicative of movement of the piston from the first position towards the second position. Alternatively, the detection signal may indicate that the piston is in the first position.

The apparatus may be arranged to dispense flowable product from the chamber via the product outlet during movement of the piston from the first position towards the second position. The apparatus may be arranged to deliver flowable product into the chamber from an air-tight cavity of a connected collapsible container during movement of the piston towards the first position.

The apparatus may comprise a vacuum pump which may be selectively operable to move the piston towards the first position.

In one embodiment, movement of the piston to the first position, for example by the vacuum pump, may be prevented when the supply of flowable product in the air-tight cavity of a connected collapsible container is fully depleted. As explained above, this occurs due to pressurisation of the chamber. Thus, an alert may be generated by the control unit upon detecting that the piston has not been moved to the first position by the vacuum pump, the alert providing a user with an indication that the connected collapsible container is empty and requires replacement.

In another embodiment, movement of the piston from the first position towards the second position may only occur when the supply of flowable product in the air-tight cavity of a connected collapsible container is fully depleted. Thus, the alert generated upon detection of movement of the piston from the first position provides a user with an indication that the connected collapsible container is empty and requires replacement. With this arrangement, the user is given sufficient time to disconnect the empty collapsible container and to connect a replacement collapsible container containing a further supply of flowable product because the flowable product in the chamber acts as a reserve volume.

The vacuum pump may be selectively operable to move the piston from the second position to the first position and may comprise a further transducer which may be arranged to detect when the piston is in the second position and to transmit a detection signal to the control unit.

The further transducer may be a proximity sensor and could, for example, be a Hall effect sensor.

The control unit may be arranged to control the operation of the vacuum pump to move the piston from the second position to the first position upon receiving the detection signal from the transducer.

When the piston is moved from the second position to the first position by the vacuum pump, flowable product from a connected collapsible container is sucked from the air-tight cavity through the opening in the collapsible container and into the chamber through the product inlet. Thus, movement of the piston from the second position to the first position fills the chamber with flowable product from the air-tight cavity of the connected collapsible container. The provision of the further transducer and the transmission of the detection signal ensures that the filling process only occurs when the piston is in the second position, defining the minimum chamber volume. This in turn ensures that substantially all flowable product in the chamber, for example from a previously connected collapsible container, is dispensed before fresh flowable product, for example from a newly connected collapsible container, is sucked into the chamber. This advantageously ensures that existing flowable product, whose properties may degrade over time, is not trapped in the chamber and mixed with fresh flowable product delivered from the air-tight cavity of the newly connected collapsible container.

The apparatus may comprise a dispensing pump for conveying the flowable product from the product outlet. The dispensing pump may be a peristaltic pump. During operation of the dispensing pump, a suction force may be applied to a contact surface of the piston in contact with the flowable product inside the chamber. The application of the suction force to the contact surface moves the piston from the first position towards the second position as flowable product is dispensed from the chamber.

The apparatus may comprise a retainer which may be arranged to retain the piston in the first position when the suction force applied to the contact surface of the piston is less than, or equal to, a predetermined retaining force. The retainer may comprise a magnet assembly. The magnet assembly may comprise first and second magnets having opposite polarities, e.g., a North pole and a South pole. The retainer may be arranged to release the piston and allow movement of the piston from the first position towards the second position when the suction force is greater than the predetermined retaining force.

In some embodiments, when the collapsible container connected to the reservoir chamber contains a sufficient volume of flowable product, the pumping forces generated by the dispensing pump suck flowable product from the air-tight cavity in the connected collapsible container into the chamber via the product inlet and out of the chamber through the product outlet, and the suction force applied to the contact surface of the piston due to the operation of the dispensing pump does not exceed the predetermined retaining force. Thus, the piston remains in the first position during this normal operating state. When the supply of flowable product in the air-tight cavity of a connected collapsible container is fully depleted because it has been used up in preceding dispensing operations, the pumping forces generated by the dispensing pump increase and, hence, the suction force applied to the contact surface of the piston also increases. When the suction force attains a level which exceeds the predetermined retaining force, the retaining force exerted by the retainer on the piston is overcome and the retainer releases the piston enabling it to move from the first position towards the second position during operation of the dispensing pump. This movement allows flowable product inside the chamber to be dispensed from the product outlet even though the supply of flowable product in the air-tight cavity of the connected collapsible container is fully depleted. Thus, the apparatus is still advantageously capable of dispensing flowable product even though no flowable product is available in the connected collapsible container because the chamber contains a reserve volume of flowable product that can be dispensed from the product outlet when the supply of flowable product in the connected collapsible container is fully depleted and no further product can be delivered from the container's air-tight cavity. This means that the apparatus can still be used to dispense flowable product, and that a user does not have to immediately connect a replacement collapsible container containing further flowable product, for a period of time after the supply of flowable product in a connected collapsible container is fully depleted.

The apparatus may comprise a conduit which may have a first end connected to the product outlet and which may have a second end through which the flowable product may be dispensed. A dispensing outlet may be provided at the second end of the conduit. The dispensing pump may be arranged to convey the flowable product along the conduit from the first end to the second end. In embodiments in which the dispensing pump is a peristaltic pump, the conduit may be a deformable conduit and the peristaltic pump may include a stator and a rotor which may cooperate to compress the deformable conduit and thereby convey the flowable product along the conduit from the first end to the second end by peristaltic action.

In another embodiment, the apparatus may comprise a linear actuator for controlling the movement of the piston between the first and second positions. The control unit may be arranged to monitor the movement of the piston based on an actuation signal received by the control unit from the linear actuator. The actuation signal may be indicative of movement of the piston towards the first position.

The movement of the piston towards the first position may be restricted when the supply of flowable product in a connected collapsible container is fully depleted, due to the vacuum that is created inside the air-tight cavity. Thus, the alert may be generated by the control unit when the actuation signal indicates that movement of the piston towards the first position is restricted. By monitoring the movement of the piston towards the first position in this way, an indication can be provided to a user, by way of the alert, that the connected collapsible container is empty and requires replacement. Again, with this arrangement, the user is given sufficient time to disconnect the empty collapsible container and to connect a replacement collapsible container containing a further supply of flowable product.

The linear actuator may comprise an electric motor and the actuation signal may be based on a drive current required to drive the electric motor and to thereby move the piston towards the first position. The control unit may be arranged to generate said alert when the monitored drive current required to drive the electric motor and thereby move the piston towards the first position exceeds a predetermined value.

As noted above, when the supply of flowable product in the air-tight cavity of a connected collapsible container is depleted, a vacuum is created when an attempt is made to withdraw further flowable product from the air-tight cavity. As a consequence, when the control unit operates the linear actuator to move the piston towards the first position, the movement of the piston is restricted by the vacuum and an increased drive current must be supplied to the electric motor to ensure continued movement of the piston. Thus, by arranging the control unit to monitor the drive current, a simple mechanism is provided to determine when the supply of flowable product in a connected collapsible container is fully depleted.

The control system may be arranged to disable the electric motor when the monitored drive current exceeds the predetermined value, for example by interrupting an electrical supply to the electric motor.

The control unit may be arranged to monitor the movement of the piston, for example towards the second position, based on a pressure signal received by the control unit from a pressure transducer. The pressure transducer may be arranged to monitor the pressure inside the chamber and may in particular be arranged to monitor a pressure increase inside the chamber. The pressure transducer may, for example, be a pressure switch. The pressure signal may be indicative of a pressure increase in the chamber. In particular, and as noted above, when the supply of flowable product in the air-tight cavity of a connected collapsible container is depleted, a vacuum is created when an attempt is made to withdraw further flowable product from the air-tight cavity. In other words, the pressure in the chamber increases when the control unit operates the linear actuator to move the piston towards the first position. Thus, by arranging the control unit to monitor the pressure inside the chamber, a simple mechanism is provided to determine when the supply of flowable product in a connected collapsible container is fully depleted. The control unit may be arranged to generate said alert upon receiving the pressure signal from the pressure transducer. The control unit may be arranged to disable the linear actuator upon receiving the pressure signal from the pressure transducer.

The control unit may be arranged to control the operation of the linear actuator to thereby control the movement of the piston between the first and second positions. For example, the control unit may be arranged to control the operation of the linear actuator to move the piston towards the second position during a dispense cycle and towards the first position, e.g. from the second position or from a position intermediate the first and second positions, during a fill cycle.

The control unit may be arranged to transmit a fill control signal to the linear actuator to operate the linear actuator to move the piston towards the first position to thereby deliver flowable product from the air-tight cavity of a connected collapsible container into the chamber via the product inlet. The control unit may be arranged to transmit a dispense control signal to the linear actuator to operate the linear actuator to move the piston towards the second position to thereby convey flowable product from the chamber via the product outlet.

With this arrangement, the piston is advantageously used to fill the chamber with flowable product from the air-tight cavity of a connected collapsible container during the fill cycle and to dispense flowable product from the chamber via the product outlet during the dispense cycle. A separate dispensing pump is not required.

The apparatus may comprise an inlet valve associated with the product inlet and an outlet valve associated with the product outlet. The inlet valve controls the delivery of flowable product into the chamber via the product inlet from the air-tight cavity of a connected collapsible container. The outlet valve controls the delivery of flowable product from the chamber via the product outlet.

One or both of the inlet valve and the outlet valve may be an electromechanical valve which may be controllable by the control unit to move between an open position and a closed position.

The inlet valve may be controlled by the control unit to adopt the open position during movement of the piston towards the first position to allow the delivery of flowable product from the air-tight cavity of a connected collapsible container into the chamber and to adopt the closed position during movement of the piston towards the second position.

The outlet valve may be controlled by the control unit to adopt the closed position during movement of the piston towards the first position and to adopt the open position during movement of the piston towards the second position to allow flowable product to be conveyed from the chamber via the product outlet.

The inlet valve may comprise a one-way inlet valve which may be associated with the product inlet. The one-way inlet valve may be arranged to adopt an open configuration during movement of the piston towards the first position, during the fill cycle, to allow the delivery of flowable product from the air-tight cavity of a connected collapsible container into the chamber. The one-way inlet valve may be arranged to adopt a closed configuration during movement of the piston towards the second position, during the dispense cycle. Thus, when the piston is being moved by the linear actuator towards the second position during the dispense cycle to convey flowable product from the chamber via the product outlet, the closed configuration adopted by the one-way inlet valve prevents the flowable product from flowing back into the air-tight cavity of a connected collapsible container.

The outlet valve may comprise a one-way outlet valve which may be associated with the product outlet. The one-way outlet valve may be arranged to adopt a closed configuration during movement of the piston towards the first position, i.e. during the fill cycle, and may be arranged to adopt an open configuration during movement of the piston towards the second position, i.e. during the dispense cycle. The closed configuration adopted by the one-way outlet valve during movement of the piston towards the first position, during the fill cycle, ensures that only flowable product from the air-tight cavity of a connected collapsible container is delivered to the chamber to re-fill the chamber. The open configuration adopted by the one-way outlet valve during movement of the piston towards the second position enables flowable product to be conveyed from the chamber via the product outlet during the dispense cycle.

DETAILED DESCRIPTION OF EMBODIMENTS

Figure 1:
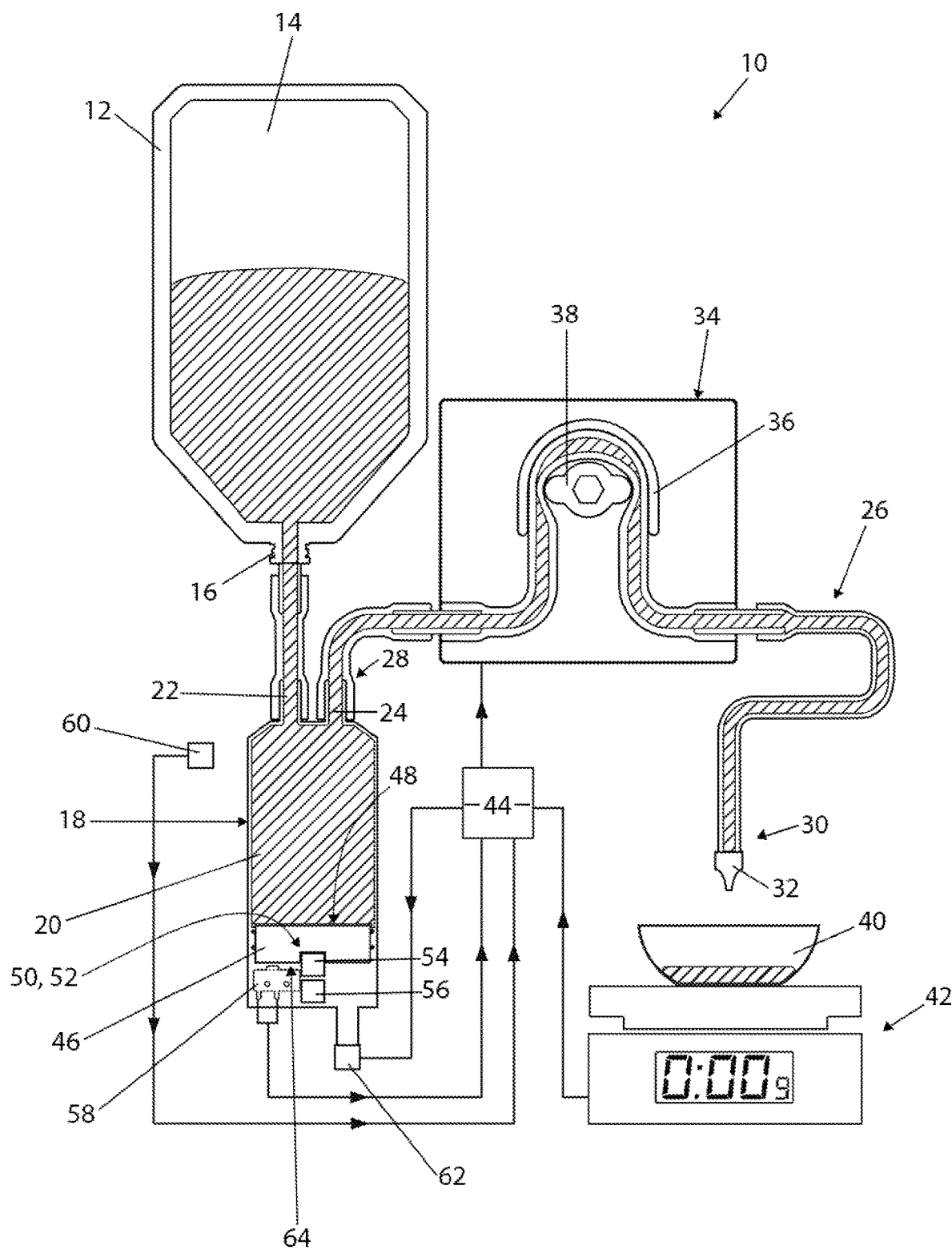
FIG. 1 is a diagrammatic view of a first embodiment of an apparatus for dispensing a flowable product showing the operation of the apparatus when connected to a collapsible container containing flowable product.
Figure 2:
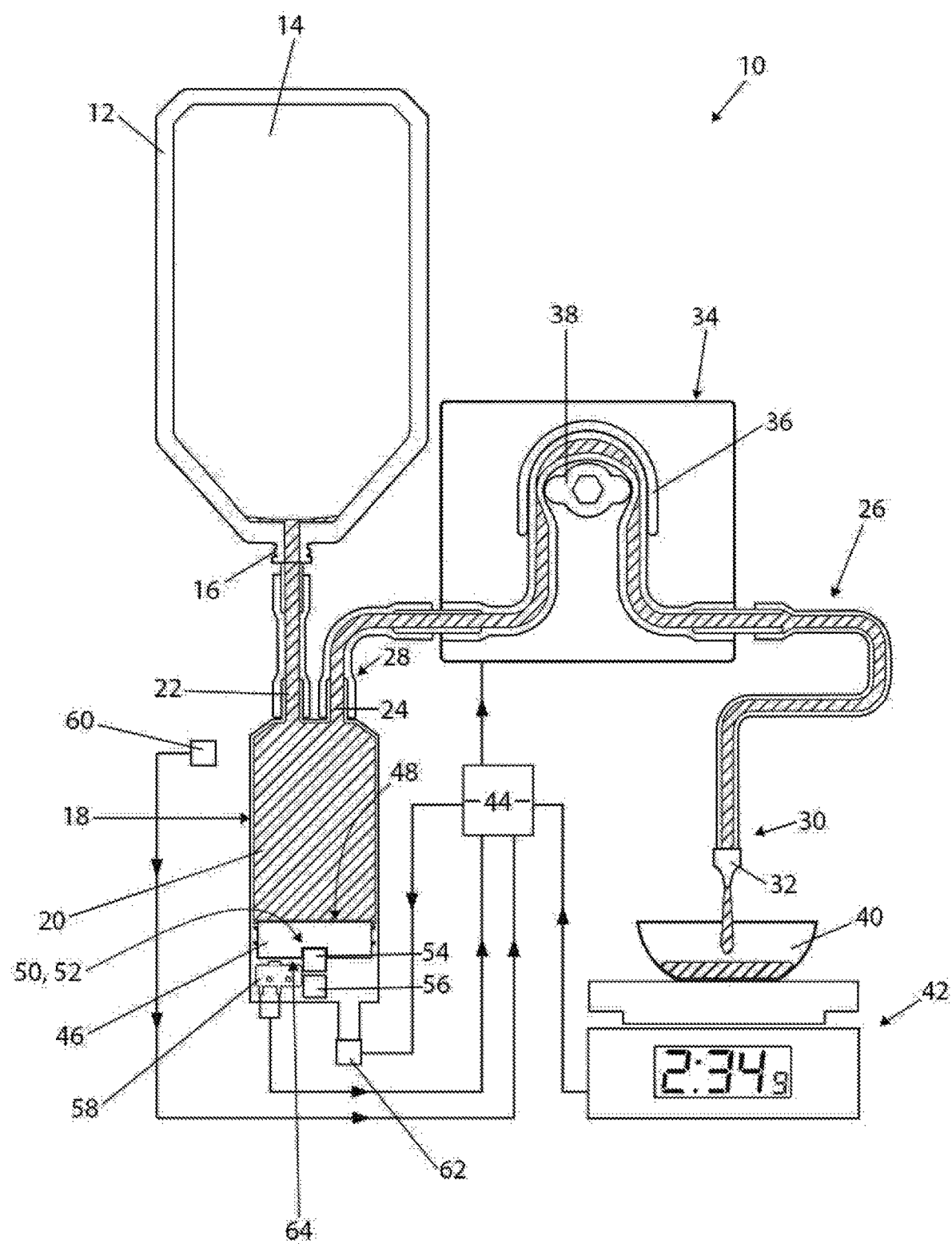
FIG. 2 is a diagrammatic view similar to FIG. 1 showing the operation of the apparatus when the supply of flowable product in the connected collapsible container is fully depleted.
Figure 3:
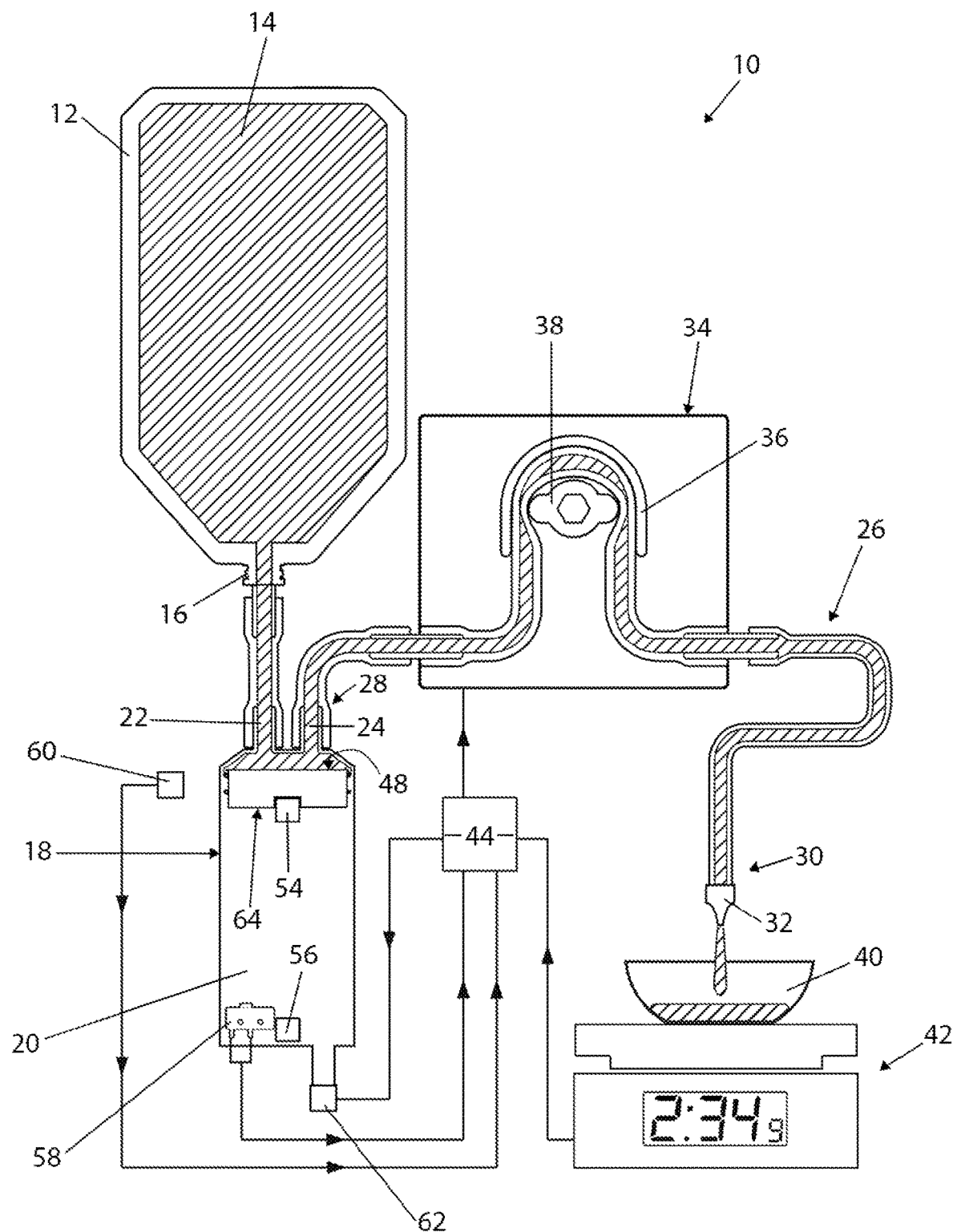
FIG. 3 is a view similar to FIG. 2 showing the operation of the apparatus after connection of a replacement collapsible container containing flowable product.

Embodiments of the present disclosure will now be described by way of example only and with reference to the accompanying drawings in which FIGS. 1 to 3 illustrate a first embodiment of an apparatus 10 for dispensing a flowable product from a collapsible container 12. The collapsible container 12 is typically an air-tight pouch, for example a foil pouch, and comprises an air-tight cavity 14 containing the flowable product. The air-tight cavity 14 is filled with a desired flowable product, for example by a product manufacturer, before the air-tight cavity 14 is sealed. The collapsible container 12 includes an opening 16 which allows the flowable product to be delivered from the air-tight cavity 14 when the collapsible container 12 is connected to the apparatus 10.

The apparatus 10 comprises a reservoir 18 having a chamber 20 for receiving and storing flowable product delivered from the connected collapsible container 12. The chamber 20 includes a product inlet 22 which is connected to the opening 16 so that flowable product can be delivered into the chamber 20 from the air-tight cavity 14 of the collapsible container 12. The chamber 20 also includes a product outlet 24 through which flowable product can be delivered from the chamber 20.

The apparatus 10 includes a conduit 26 having a first end 28 connected to the product outlet 24 and a second end 30 provided with a dispensing outlet 32 through which the flowable product can be dispensed. A dispensing pump 34 is provided to convey the flowable product from the product outlet 24 and along the conduit 26 from the first end 28 towards the second end 30. In the illustrated embodiment, the dispensing pump 34 is a peristaltic pump having a stator 36 and a rotor 38 and the conduit 26 comprises a flexible material which can be compressed. As will be understood by one of ordinary skill in the art, the stator 36 and the rotor 38 cooperate to compress the conduit 26 and as the rotor 38 rotates relative to the stator 36, flowable product is conveyed along the conduit 26 from the first end 28 towards the second end 30 by peristaltic action. The rotor 38 is typically engaged by, and driven by, an external rotary drive (not shown), for example a stepper motor.

The apparatus 10 may include a receptacle 40 into which the flowable product is dispensed from the dispensing outlet 32. The receptacle 40 may be associated with a load cell 42 which is arranged to determine the mass of flowable product dispensed into the receptacle 40 from the dispensing outlet 32.

The apparatus 10 includes a control unit 44. The control unit 44 is arranged to receive a load measurement signal from the load cell 42 and to control the operation of the dispensing pump 34, for example by controlling the operation of the external rotary drive, based on the load measurement signal received from the load cell 42.

The control unit 44 may receive a control signal indicating a desired mass of flowable product that needs to be dispensed into the receptacle 40. When the flowable product is a hair colouring for example, a desired mass of flowable product may be selected to achieve a desired hair colour. The control unit 44 is arranged to control the dispensing pump 34 to dispense the predetermined mass of flowable product based on the control signal and the load measurement signal received from the load cell 42. As will be understood by one of ordinary skill in the art, when the load measurement signal received by the control unit 44 from the load cell 42 indicates that the desired mass of flowable product has been dispensed into the receptacle 40, the control unit 44 terminates the operation of the dispensing pump 34 to prevent further flowable product from being dispensed. Thus, the load measurement signal from the load cell 42 acts as a feedback control signal for the control unit 44 enabling it to control the operation of the dispensing pump 34 and thereby dispense accurate quantities of flowable product into the receptacle 40.

The apparatus 10 further comprises a piston 46 which is positioned inside the chamber 20 and which is movable inside the chamber 20 to vary the internal volume of the chamber 20. The piston 46 is movable between a first position shown in FIG. 1 which defines a maximum chamber volume and a second position shown in FIG. 3 which defines a minimum chamber volume. When the piston 46 is in the second position, the chamber 20 is substantially devoid of flowable product.

A normal operating state of the apparatus 10 is shown in FIG. 1, in which the piston 46 is in the first position and the chamber volume is at its maximum. In this normal operating state, the chamber 20 is filled with flowable product from the connected collapsible container 12 and the dispensing pump 34 is selectively operated, by the control unit 44, to dispense desired quantities of flowable product into the receptacle 40 in the manner generally described above.

During operation of the dispensing pump 34, the pumping forces suck flowable product from the air-tight cavity 14 in the collapsible container 12 through the chamber 20 and along the conduit 26 to the dispensing outlet 32, where the flowable product is dispensed into the receptacle 40. During this dispensing operation when the dispensing pump 34 is operating, a suction force is applied to a contact surface 48 of the piston 46 which is in contact with the flowable product inside the chamber 20, through the medium of the flowable product. When the applied suction force is less than a predetermined retaining force, the piston 46 is retained in the first position by a retainer 50 which, in the illustrated embodiment, comprises a magnet assembly 52 comprising first and second magnets 54, 56 having opposite polarities. The magnetic strength of the first and second magnets 54, 56 is selected such that the predetermined retaining force is greater than the suction force applied to the contact surface 48 of the piston 46 by the dispensing pump 34 when the connected collapsible container 12 contains flowable product that can be delivered through the chamber 20 and into the conduit 26 via the product outlet 24. Thus, during the normal operating state, the piston 46 is always securely retained in the first position illustrated in FIG. 1 by the magnet assembly 52.

Referring now to FIG. 2, when the flowable product in the connected collapsible container 12 has been used up in dispensing operations and the air-tight cavity 14 is empty, a vacuum is generated and the pumping forces thereby increase. As a consequence, the suction force exerted by the dispensing pump 34, through the medium of the flowable product, on the contact surface 48 of the piston 46 also increases. When the suction force exceeds the predetermined retaining force applied by the magnet assembly 52, the piston 46 starts to move from the first position towards the second position as shown in FIG. 2. Consequently, the apparatus 10 can still continue to dispense flowable product even though the connected collapsible container 12 is empty, because the chamber 20 provides a reserve volume of flowable product that is available for dispensing. Thus, the dispensing operation is not interrupted and the apparatus 10 can continue to reliably dispense flowable product until the chamber 20 is itself empty.

In order to alert a user that the connected collapsible container 12 is empty and needs to be replaced, the apparatus 10 comprises a transducer 58, for example in the form of a limit switch, which is arranged to detect when movement of the piston 46 from the first position commences and to transmit a detection signal to the control unit 44. When the control unit 44 receives the detection signal from the transducer 58, the control unit 44 generates an alert, for example a visual and/or an audible alert, thereby prompting the user to disconnect the empty collapsible container 12 and to connect a replacement collapsible container 12 containing a fresh supply of flowable product. It will be understood that the amount of time remaining, after the generation of the alert by the control unit 44, before the reserve supply of flowable product in the chamber 20 is used up and therefore before a new collapsible container 12 needs to be connected to ensure uninterrupted dispensing, is dependent upon the maximum volume of the chamber 20 when the piston 46 is in the first position.

Advantageously, a user does not need to wait until the flowable product has been dispensed from the chamber 20 via the product outlet 24 before connecting a replacement collapsible container 12 which contains a fresh supply of flowable product. On the contrary, a replacement collapsible container 12 can be connected to the product inlet 22 at any time after the user has been alerted by the control unit 44 that movement of the piston 46 from the first position towards the second position has commenced, in other words that the connected collapsible container 12 is empty. In accordance with aspects of the present disclosure, when a replacement collapsible container 12 is connected to the product inlet 22, movement of the piston 46 from the first position continues until the piston 46 reaches the second position shown in FIG. 3, thereby ensuring that flowable product continues to be delivered from the chamber 20 during operation of the dispensing pump 34 rather than from the air-tight cavity 14 in the newly connected collapsible container 12. This occurs because the pumping resistance in the chamber 20 is lower than the pumping resistance in the air-tight cavity 14.

The apparatus 10 includes a transducer 60, typically a proximity sensor such as a Hall effect sensor, which is arranged to detect when the piston 46 reaches the second position and to send a detection signal to the control unit 44. The receipt of the detection signal by the control unit 44 confirms that substantially all of the flowable product available in the chamber 20 has been dispensed. Upon receiving the detection signal from the transducer 60, the control unit 44 is arranged to control the operation of a vacuum pump 62 so that it applies a suction force to a surface 64 of the piston 46 opposite to the contact surface 48 to thereby move the piston 46 from the second position to the first position. During movement of the piston 46 from the second position shown in FIG. 3 back to the first position shown in FIG. 1, flowable product from the newly connected collapsible container 12 is drawn from the air-tight cavity 14 into the chamber 20 until the piston 46 reaches the first position and the chamber 20 is once again filled with flowable product. Once the piston 46 reaches the first position, this is detected by the transducer 58 and a detection signal is transmitted to the control unit 44, causing the control unit 44 to cease operation of the vacuum pump 62 and to open a vent valve (not shown), for example a solenoid-controlled vent valve, to relieve pressure, and hence suction force, acting on the piston surface 64 and to allow it to vent to atmosphere. As will be understood, the first and second magnets 54, 56 also cooperate to retain the piston 46 in the first position and the apparatus 10 returns to the normal operating state described above until such time as the supply of flowable product in the connected collapsible container 12 is again fully depleted and movement of the piston 46 from the first position to the second position thereby commences.

Although the apparatus 10 has been described as comprising only one reservoir 18 and associated component parts and a corresponding dispensing pump 34, it will be understood by one of ordinary skill in the art that the apparatus 10 typically comprises a plurality of reservoirs 18 and associated component parts and a plurality of corresponding dispensing pumps 34 in combination with a single control unit 44 and load cell 42. In such an apparatus 10, a plurality of collapsible containers 12 containing different flowable products, for example one of a plurality of hair colourings, a colourless base or an additive, are each connected to a respective one of the reservoirs 18 and each dispensing pump 34 is arranged to be controlled by the control unit 44, based on the control signal and the load measurement signal received from the load cell 42, to dispense a predetermined quantity of each flowable product into the receptacle 40. In this way, the dispensed flowable products can be mixed together in the receptacle 40, for example to enable a desired hair colour to be obtained when the mixture of flowable products is applied to a client's hair.

In such an apparatus 10 comprising a plurality of reservoirs 18 and associated component parts and a plurality of corresponding dispensing pumps 34, the apparatus 10 operates in the manner described above to dispense flowable product from a respective reservoir chamber 20 when the supply of flowable product in any one of the connected collapsible containers 12 is fully depleted and further flowable product cannot be dispensed from the respective airtight cavity 14 inside a connected collapsible container 12.

Figure 4:
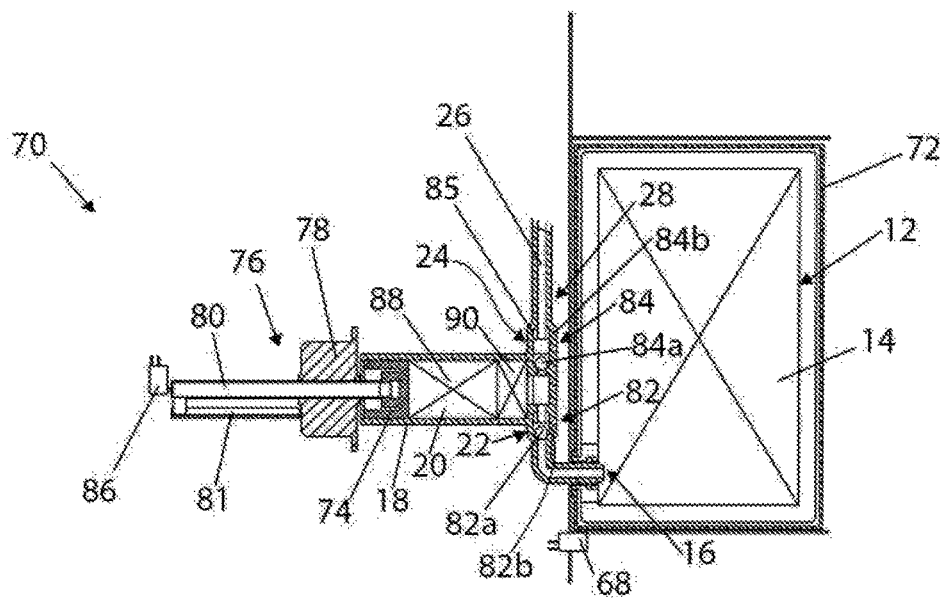
FIGS. 4 and 5 are diagrammatic views of part of a second embodiment of an apparatus for dispensing a flowable product showing the operation of the apparatus when connected to a collapsible container containing flowable product.
Figure 5:
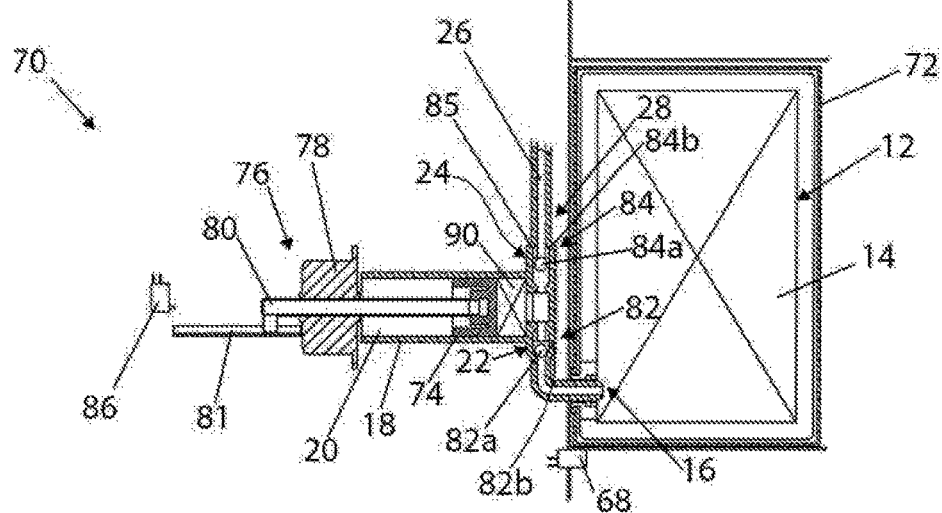
Figure 6:
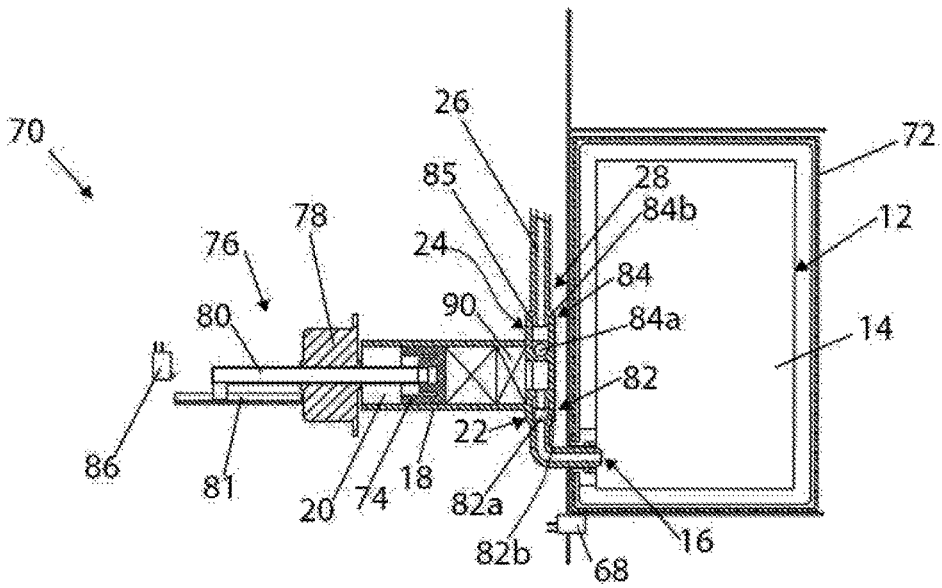
FIG. 6 is a diagrammatic view showing the operation of the apparatus of FIGS. 4 and 5 when the supply of flowable product in the connected collapsible container is fully depleted.

FIGS. 4 to 6 illustrate part of a second embodiment of an apparatus 70 for dispensing a flowable product from a collapsible container 12 which is similar to the apparatus 10 shown in FIGS. 1 to 3 and in which corresponding components are identified using corresponding reference numerals.

The apparatus 70 is shown connected to a collapsible container 12 housed in a rigid outer carton 72, thereby forming what is commonly known as a bag-in-box container. The provision of a rigid outer carton 72 is, however, not essential and could be omitted. Similarly, the collapsible container 12 illustrated in FIGS. 1 to 3 could be housed in a rigid outer carton. The collapsible container 12 illustrated in FIGS. 4 to 6 has an air-tight cavity 14 containing a flowable product and an opening 16 which allows the flowable product to be delivered from the air-tight cavity 14 when the collapsible container 12 is connected to the apparatus 70.

The apparatus 70 comprises a reservoir 18 having a chamber 20 for receiving and storing flowable product delivered from the air-tight cavity 14 of the connected collapsible container 12. The chamber 20 includes a product inlet 22 which is connected to the opening 16 so that flowable product can be delivered into the chamber 20 from the air-tight cavity 14 of the collapsible container 12. The chamber 20 also includes a product outlet 24 through which flowable product can be delivered from the chamber 20 and into a conduit 26 having a first end 28 connected to the product outlet 24 and a second end (not shown) having a dispensing outlet. A detector 68, for example in the form of a switch, may be provided to detect when a collapsible container 20 is connected to the apparatus 70.

The apparatus 70 comprises a piston 74 which is positioned inside the chamber 20 and which is movable linearly inside the chamber 20 to vary the internal volume of the chamber 20. The piston 74 is movable between a first position shown in FIG. 4 which defines a maximum chamber volume and a second position which defines a minimum chamber volume. When the piston 74 is in the second position, the chamber 20 is substantially devoid of flowable product. As will be described in further detail below, movement of the piston 74 towards the second position dispenses flowable product from the chamber 20 via the product outlet 24 and occurs during a dispense cycle. Conversely, movement of the piston 74 towards the first position delivers flowable product from the air-tight cavity 14 of a connected collapsible container 12 into the chamber 20 to fill the chamber 20 with flowable product.

The apparatus 70 comprises a linear actuator 76 for controlling the movement of the piston 74 inside the chamber 20 between the first and second positions. In the illustrated embodiment, the linear actuator 76 comprises an electric motor 78, typically a stepper motor, and a leadscrew 80. The electric motor 78 and leadscrew 80 may be arranged in any suitable manner to convert rotational motion of the electric motor 78 into linear movement of the leadscrew 80. The leadscrew 80 may cooperate with a guide 81 to prevent rotation of the leadscrew 80.

Like the apparatus 10, the apparatus 70 includes a receptacle 40 into which flowable product is dispensed, a load cell 42 and a control unit 44. The apparatus 70 operates in a similar way to the apparatus 10 illustrated in FIGS. 1 to 3 to dispense a predetermined mass of flowable product into the receptacle 40 and the dispensing operation is controlled by the control unit 44 based on the load measurement signal received from the load cell 42.

The operation of the linear actuator 76, and hence the movement of the piston 74 between the first and second positions, is controlled by the control unit 44. During the fill cycle, the control unit 44 transmits a fill control signal to the linear actuator 76 to operate the linear actuator 76 and thereby move the piston 74 towards the first position, e.g. from the second position or from a position intermediate the first and second positions, to thereby deliver flowable product from the air-tight cavity 14 of a connected collapsible container 12 into the chamber 20. During the dispense cycle, the control unit 44 transmits a dispense control signal to the linear actuator 76 to operate the linear actuator 76 and thereby move the piston 74 towards the second position to thereby convey flowable product from the chamber 20 via the product outlet 24.

The apparatus 70 comprises a one-way inlet valve 82 at the product inlet 22. The one-way inlet valve 82, typically comprising a closing member 82a positioned inside a valve body 82b, is arranged to adopt an open configuration during movement of the piston 74 towards the first position, thereby allowing flowable product to be delivered from the air-tight cavity 14 of a connected collapsible container 12 into the chamber 20 during the fill cycle. The one-way inlet valve 82 is arranged to adopt a closed configuration during movement of the piston 74 towards the second position. Thus, when the piston 74 is being moved by the linear actuator 76 towards the second position during the dispense cycle to convey flowable product from the chamber 20 via the product outlet 24, the closed configuration adopted by the one-way inlet valve 82 prevents the flowable product from flowing back into the air-tight cavity 14 of a connected collapsible container 12.

The apparatus 70 also comprises a one-way outlet valve 84 at the product outlet 24. The one-way outlet valve 84, typically comprising a closing member 84a positioned inside a valve body 84b, is arranged to adopt a closed configuration during movement of the piston towards the first position, thereby ensuring that only flowable product from the air-tight cavity 14 of a connected collapsible container 12 is delivered to the chamber 20 during the fill cycle to thereby re-fill the chamber 20. The one-way outlet valve 84 is conversely arranged to adopt an open configuration during movement of the piston towards the second position, thereby enabling flowable product to be conveyed from the chamber 20 via the product outlet 24 during the dispense cycle.

In the illustrated embodiment, it will be seen that the one-way outlet valve 84 advantageously comprises a valve body 84b with an elongated bore 85 along which the closing member 84a is movable between a closed position shown in FIG. 4 and a fully open position shown in FIG. 5. When the piston 74 is moved by the linear actuator 76 towards the second position during the dispense cycle, the closing member 84a is urged from the closed position shown in FIG. 4 to the fully open position shown in FIG. 5 by the flowable product as it is conveyed from the dispensing outlet 24. Conversely, when the piston 74 is moved by the linear actuator 76 towards the first position during the fill cycle, the closing member 84a is urged from the fully open position shown in FIG. 5 to the closed position shown in FIG. 6. As the closing member 84a moves towards the closed position along the elongated bore, it induces a reverse flow downstream of the one-way outlet valve 84 in the conduit 26 and there is a momentary delay before it reaches the closed position. The reverse flow and associated delay advantageously sucks flowable product at the dispensing outlet 32 back into the conduit 26, thereby minimising the risk that flowable product at the dispensing outlet 32 will fall into the receptacle 40 in an uncontrolled manner or that flowable product at the dispensing outlet 32 will be subject to degradation, e.g., due to bacterial attack.

The apparatus 70 is shown in FIG. 4 in a primed state in which the piston 74 is in the first position and the chamber volume is at its maximum. In this primed state, the chamber 20 is filled with flowable product from the air-tight cavity 14 of a connected collapsible container 12 by implementing the fill cycle described above. In some embodiments, the apparatus 70 comprises a detector 86, for example in the form of a limit switch, which detects when the piston 74 is in the first position and sends a detection signal to the control unit 44. Upon receipt of the detection signal, the control unit 44 terminates the operation of the linear actuator 76, for example by interrupting the electrical supply to the electric motor 78, to retain the piston 74 in the first position. In the illustrated embodiment, an end of the leadscrew 80 abuts the detector 86 when the piston 74 is in the first position, but it will be understood that other arrangements are possible.

When the control unit 44 receives a control signal indicating that a desired mass flowable product needs to be dispensed into the receptacle 40, the control unit 44 initiates the dispense cycle by controlling the electric motor 78 to rotate the leadscrew 80 and thereby move the piston 74 inside the chamber 20 towards the second position. As soon as the control unit 44 determines that the dispense cycle is complete based on the load measurement signal received from the load cell 42, the control unit 44 initiates the fill cycle by controlling the electric motor 78 to rotate the leadscrew 80 in the opposite direction and thereby move the piston 74 inside the chamber 20 from its position at the end of the dispense cycle back to the first position. Once the piston 74 has returned to the first position, this is detected by the detector 86 and the control unit 44 interrupts the electrical supply to the electric motor 78, to thereby terminate the fill cycle and retain the piston 74 in the first position. Thus, the apparatus 70 is returned once again to the primed state.

The fill cycle can be executed by the control unit 44 in the manner described above, to return the piston 74 to the first position, provided that there is sufficient flowable product inside the air-tight cavity 14 of a connected collapsible container 12 to completely re-fill the chamber 20. In the event that the flowable product inside the air-tight cavity 14 becomes fully depleted because it has been consumed in one or more preceding dispense cycles, a vacuum is generated and the chamber 20 becomes pressurised as the piston 74 is moved by the linear actuator 76 towards the first position. As a result, when the fill cycle is executed by the control unit 44, the electric motor 78 experiences an increased load as it attempts to return the piston 74 to the first position. The increased load experienced by the electric motor 78 causes an increase in the drive current that must be supplied to the electric motor 78 to ensure continued movement of the piston 74 towards the first position. The increase in drive current is indicative of the fact that the supply of flowable product in the air-tight cavity 14 of a connected collapsible container 12 is depleted and that a replacement collapsible container 12 needs to be connected to the apparatus 70.

The control unit 44 continuously monitors the drive current supplied to the electric motor 78 and upon detecting an increase in the drive current above a predetermined value, the control unit 44 generates a visual and/or an audible alert which notifies a user that the connected collapsible container 12 is empty and thereby prompts the user to connect a replacement collapsible container 12 containing a further supply of flowable product. The control unit 44 may also interrupt the electrical supply to the electric motor 78 when the monitored drive current exceeds the predetermined value, to thereby disable the electric motor 78.

In a first implementation, the apparatus 70 may be arranged so that the volume of the chamber 20, when the piston 74 is in the first position, comprises a primary dispense volume 88 and a surplus dispense volume 90. The primary dispense volume 88 is notionally equal to a maximum dispense volume that can be demanded by the control unit 44 during a single dispense cycle. It is, however, possible that air bubbles may be present inside the chamber 20 or inside other component parts of the apparatus 70 and, hence, the provision of the surplus dispense volume 90 ensures that the maximum dispense volume can be delivered from the product outlet 24 during the dispense cycle when the piston 74 is initially in the first position.

In this first implementation, when the control unit 44 detects that the drive current to the electric motor 78 has exceeded the predetermined level and that the piston 74 has not returned to the first position, the control unit 44 is arranged so that it will not execute a dispense cycle. A dispense cycle cannot be reliably executed because the total volume of flowable product in the chamber 20 is less than the maximum dispense volume that can be demanded by the control unit 44 during a single dispense cycle. Thus, a dispense cycle cannot be reliably executed unless the piston 74 is in the first position. In this first implementation, it will be understood that a replacement collapsible container 12 must be connected to the apparatus 70 before further dispense cycles can be executed. Thus, the alert generated by the control unit 44 prompts a user to take immediate action to connect a replacement collapsible container 12 to the apparatus 70.

In a second implementation, the apparatus 70 may be arranged so that the volume of the chamber 20, when the piston 74 is in the first position, comprises multiple primary dispense volumes 88. Each primary dispense volume 88 is notionally equal to a maximum dispense volume that can be demanded by the control unit 44 during a single dispense cycle.

In this second implementation, when the control unit 44 detects that the drive current to the electric motor 78 has exceeded the predetermined level and that the piston 74 has not returned to the first position, the control unit 44 is arranged determine the volume of flowable product remaining in the chamber 20 based on the position of the piston 74 inside the chamber 20. If the detected position indicates that the volume of flowable product remaining in the chamber 20 is greater than the maximum dispense volume that can be demanded by the control unit 44 during a single dispense cycle, the control unit 44 will permit one or more further dispense cycles to be executed prior to connection of a replacement collapsible container 12. It will, therefore, be understood that the chamber 20 provides a reserve volume of flowable product that is available for dispensing.

In this second implementation, if the position of the piston 74 detected by the control unit 44 indicates that the volume of flowable product remaining in the chamber 20 is less than the maximum dispense volume that can be demanded by the control unit 44 during a single dispense cycle, the control unit 44 will not execute a further dispense cycle until a replacement collapsible container 20 has been connected to the apparatus 70 thereby enabling a fill cycle to be executed so that the chamber 20 is re-filled with flowable product from the air-tight cavity 14 of the connected collapsible container 12.

Figure 7:
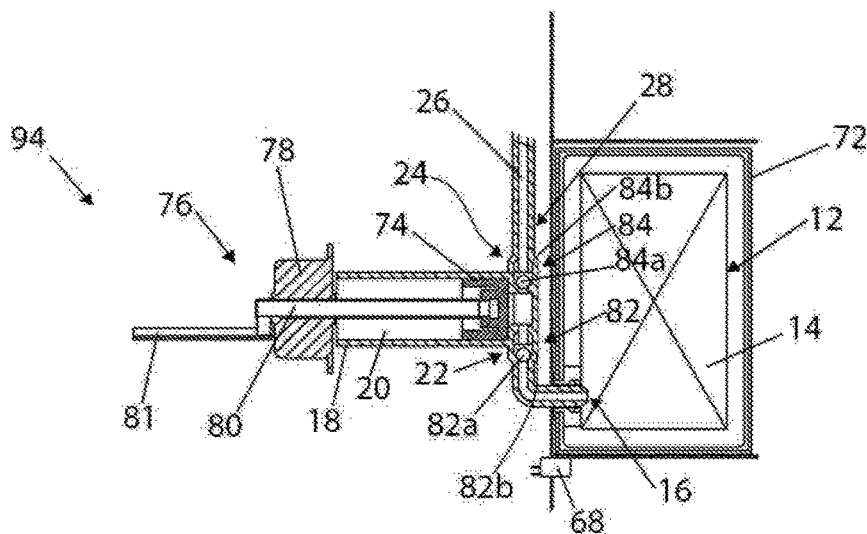
FIG. 7 is a diagrammatic view of part of a third embodiment of an apparatus for dispensing a flowable product showing the operation of the apparatus when connected to a collapsible container containing flowable product.
Figure 8:
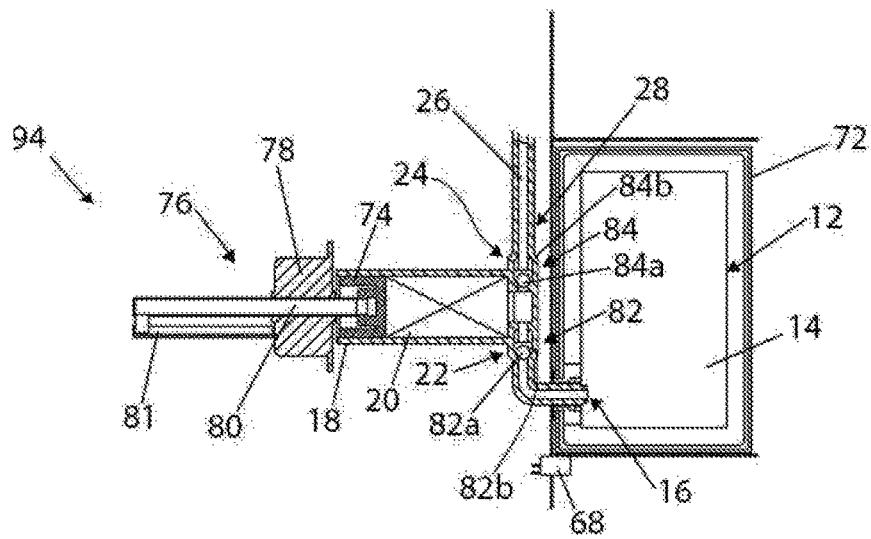
FIG. 8 is a diagrammatic view showing the operation of the apparatus of FIG. 7 when the supply of flowable product in the connected collapsible container is fully depleted, after a fill cycle.
Figure 9:
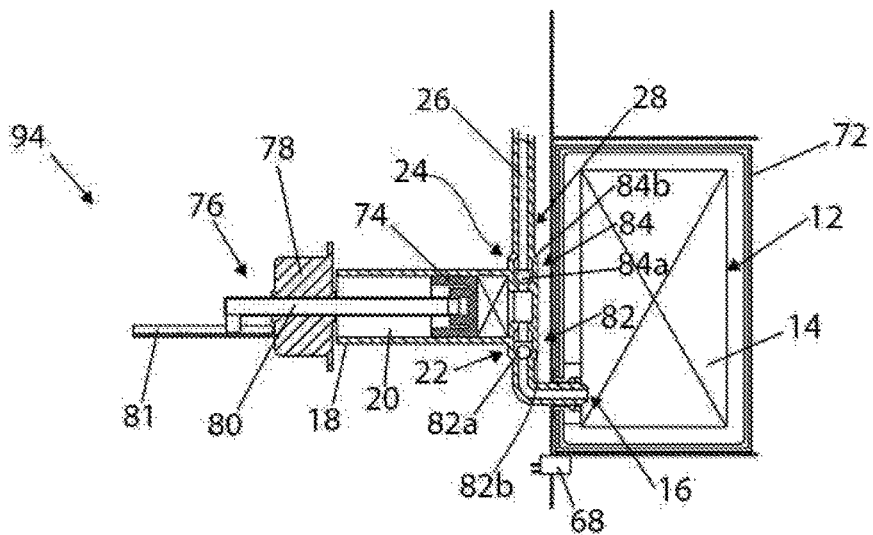
FIG. 9 is a diagrammatic view similar to FIG. 8 showing the operation of the apparatus after one or more dispense cycles and after connection of a replacement collapsible container containing flowable product.

FIGS. 7 to 9 illustrate part of a third embodiment of an apparatus 94 for dispensing a flowable product from a collapsible container 12 which is similar to the apparatus 70 shown in FIGS. 4 to 6 and in which corresponding components are identified using corresponding reference numerals.

In the apparatus 94, the chamber 20 is dimensioned so that its volume is at least equal to the volume of flowable product stored in the air-tight cavity 14 of the connected collapsible container 12. Thus, when the piston 74 is in the first position shown in FIG. 8, it will be understood that the chamber 20 stores the entire contents from the air-tight cavity 14 of a connected collapsible container 12.

In operation, the piston 74 is initially controlled by the linear actuator 76 to move to the second position shown in FIG. 7, thereby ensuring that the chamber 20 is completely devoid of flowable product. Either before or after the piston 74 has been moved to the second position, a collapsible container 12, whose air-tight cavity 14 is full of flowable product, is connected to the apparatus 94. The presence of a collapsible container 12 is detected by the detector 68 and the control unit 44 then initiates a fill cycle. Specifically, the control unit 44 controls the linear actuator 76 to move the piston 74 from the second position shown in FIG. 7 to the first position shown in FIG. 8 and in doing so, the entire contents of the flowable product are conveyed from the air-tight cavity 14 into the chamber 20.

As the piston 74 approaches the first position at the end of the fill cycle and there is no further flowable product remaining inside the air-tight cavity 14 of the connected collapsible container 12, a vacuum is generated inside the air-tight cavity 14 and the motor drive current increases for the reasons described earlier in this specification. When the control unit 44 detects that the motor drive current has increased above a predetermined value, the control unit 44 interrupts the electrical supply to the electric motor 78 to thereby disable it. In addition, the control unit 44 generates a visual and/or an audible alert to notify a user that the connected collapsible container 12 is empty and that a replacement collapsible container 12 needs to be connected to the apparatus 94. This arrangement advantageously allows the detector 86 used with the apparatus 70 of FIGS. 4 to 6 to be omitted, because the increase in motor drive current above a predetermined value is used by the control unit 44 to determine that the piston 74 has been returned to the first position by the linear actuator 76.

Because the volume of the chamber 20 in the apparatus 94 is at least equal to the volume of flowable product stored in the air-tight cavity 14 of a connected collapsible container 12, it will be understood that the chamber 20 contains multiple primary dispense volumes when the piston 74 is in the first position shown in FIG. 8. Thus, the control unit 44 is capable of performing several dispense cycles prior to connection of a replacement collapsible container 12 containing a further supply of flowable product.

The dispense cycles are carried out in the manner described above with reference to FIGS. 4 to 6.

As also described above with reference to FIGS. 4 to 6, the control unit 44 is arranged to determine the volume of flowable product remaining in the chamber 20 by detecting the position of the piston 74 inside the chamber 20. When the detected position of the piston 74 indicates that the volume of flowable product remaining in the chamber 20 is less than the maximum dispense volume that can be demanded by the control unit 44 during a single dispense cycle, the control unit 44 will not execute a further dispense cycle. Provided that a replacement collapsible container 20 has been connected to the apparatus 94, the control unit 44 will then execute the fill cycle so that the chamber 20 is re-filled with flowable product from the air-tight cavity 14 of the connected collapsible container 12.

FIGS. 10 to 13 illustrate a fourth embodiment of an apparatus 100 for dispensing a flowable product from a collapsible container 12 which is similar to the apparatus 10 shown in FIGS. 1 to 3 and in which corresponding components are identified using corresponding reference numerals.

The apparatus 100 comprises a reservoir 18 having a chamber 20 for receiving and storing flowable product delivered from the connected collapsible container 12. The chamber 20 includes a product inlet 22 which is connected to the opening 16 so that flowable product can be delivered into the chamber 20 from the air-tight cavity 14 of the collapsible container 12. The chamber 20 also includes a product outlet 24 through which flowable product can be delivered from the chamber 20 during operation of the dispensing pump 34 and into the receptacle 40 via the dispensing outlet 32 as already described in detail with reference to FIGS. 1 to 3.

The apparatus 100 comprises a piston 102 which is positioned inside the chamber 20 and which is movable inside the chamber 20 to vary the internal volume of the chamber 20. The piston 102 is movable between a first position shown in FIGS. 10 and 13 which defines a maximum chamber volume and a second position (not shown) which defines a minimum chamber volume. When the piston 102 is in the second position, the chamber 20 is substantially devoid of flowable product.

Figure 10:
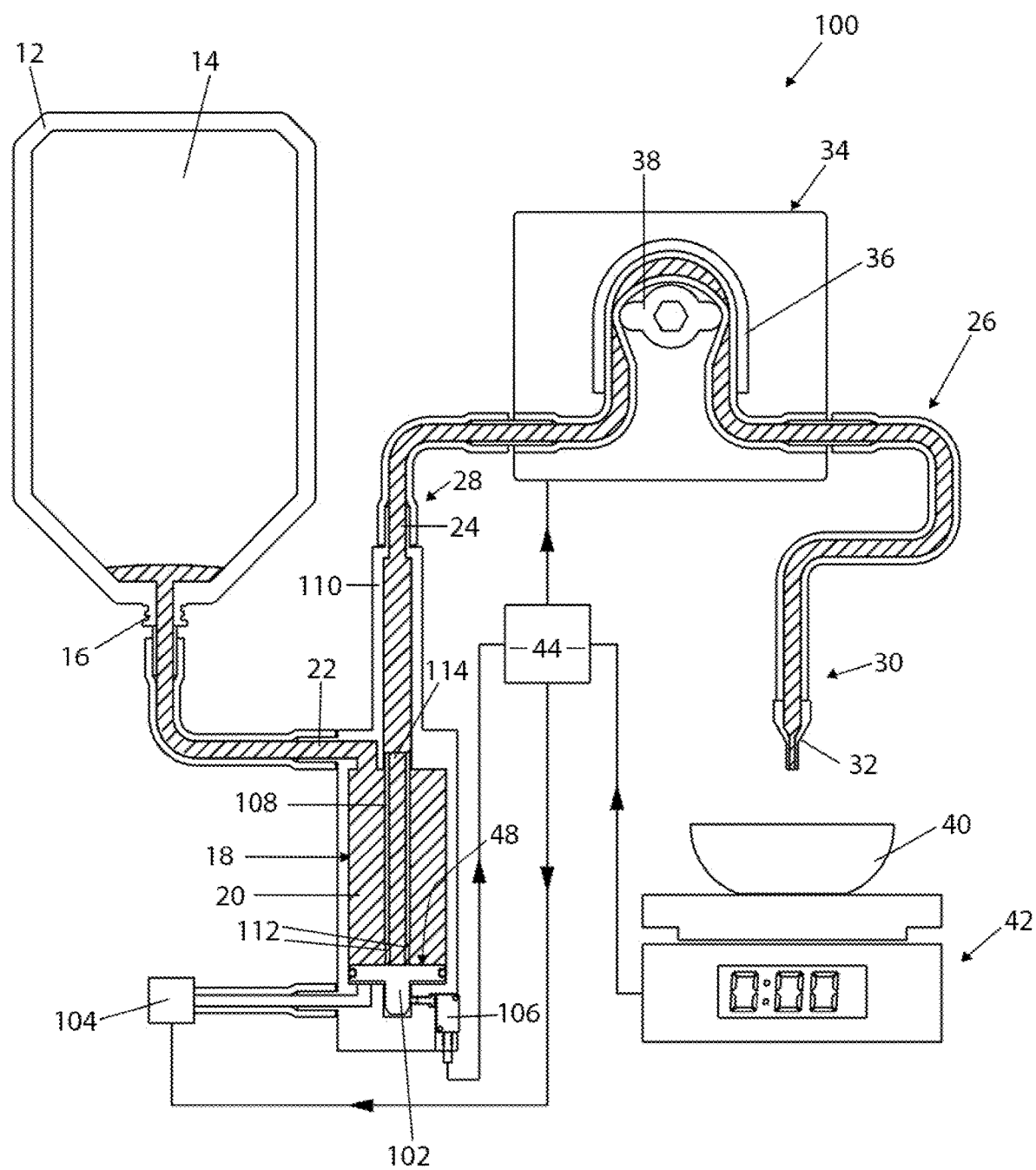
FIGS. 10 and 11 are diagrammatic views of a fourth embodiment of an apparatus for dispensing a flowable product showing the operation of the apparatus when connected to a collapsible container containing flowable product.
Figure 13:
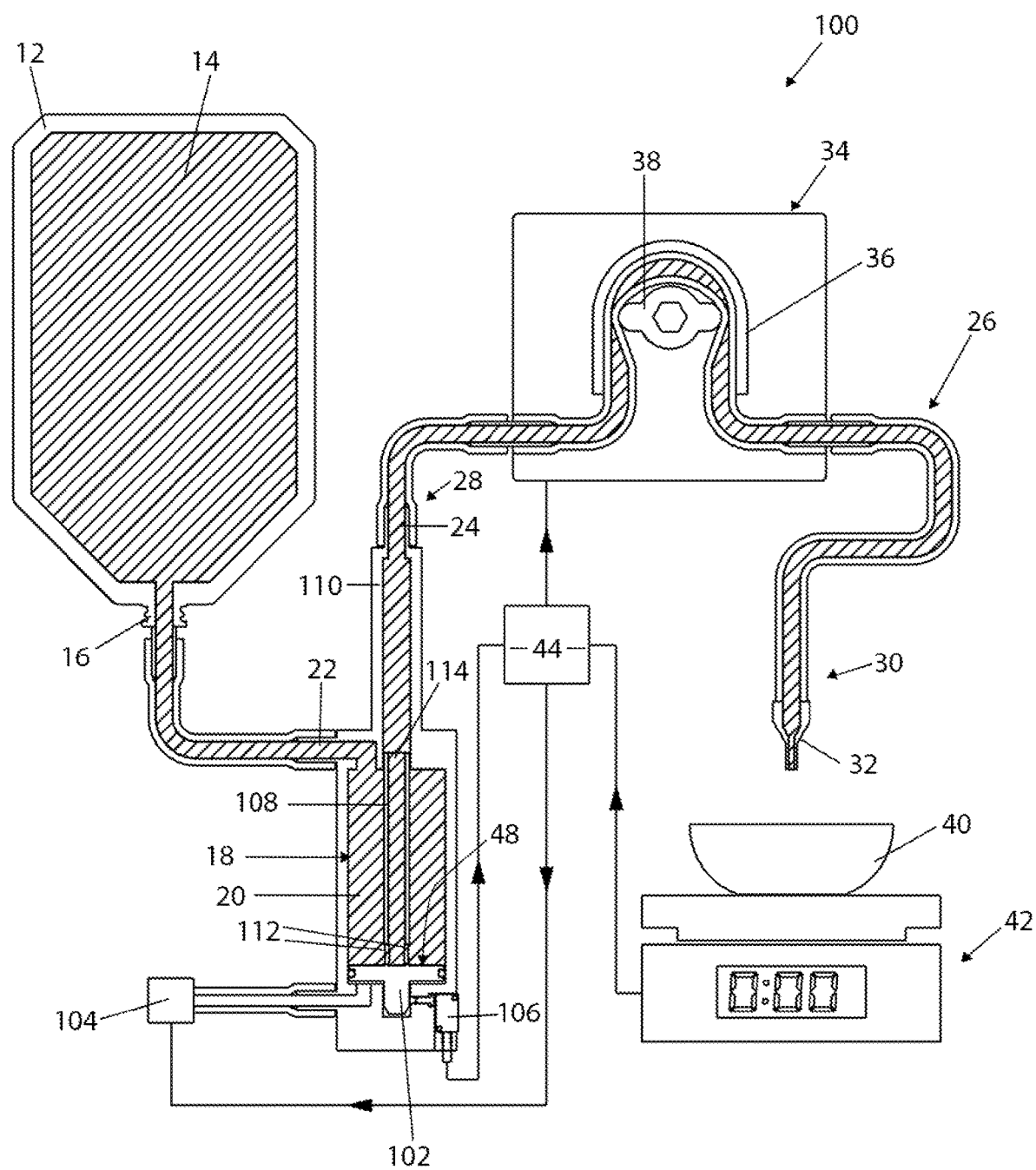
FIG. 13 is a view similar to FIG. 12 showing the operation of the apparatus after connection of a replacement collapsible container containing flowable product.

A normal operating state of the apparatus 100 is shown in FIGS. 10 and 13, in which the piston 102 is in the first position and the chamber volume is at its maximum. In this normal operating state, the chamber 20 is filled with flowable product from the connected collapsible container 12 and the dispensing pump 34 is selectively operated, by the control unit 44, to dispense desired quantities of flowable product into the receptacle 40 in the manner generally described above.

Figure 11:
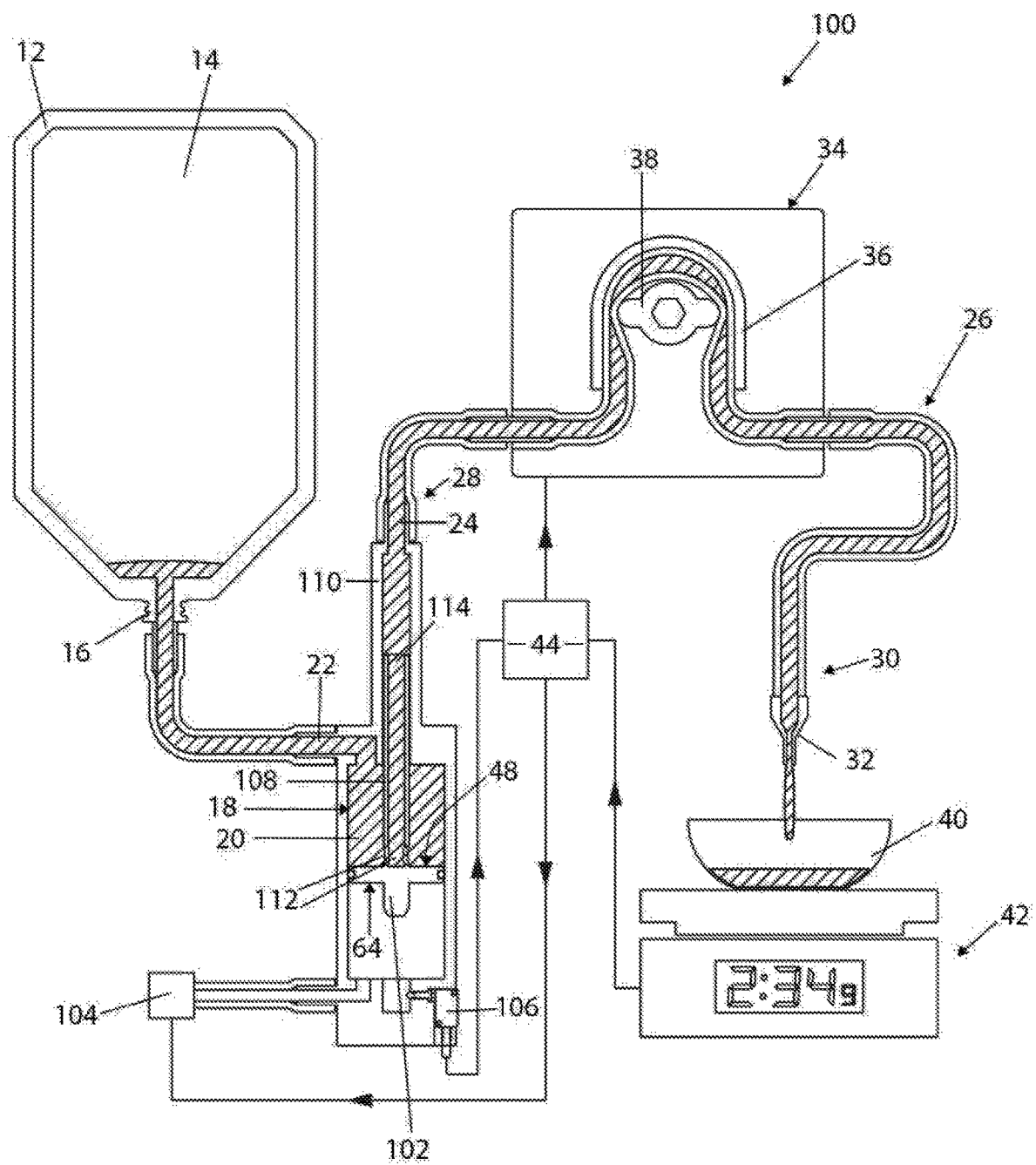

During operation of the dispensing pump 34, the pumping forces suck flowable product directly from the chamber 20 and along the conduit 26 to the dispensing outlet 32, where the flowable product is dispensed into the receptacle 40. During this dispensing operation when the dispensing pump 34 is operating, a suction force is applied to a contact surface 48 of the piston 102 which is in contact with the flowable product inside the chamber 20, through the medium of the flowable product. The applied suction force moves the piston 102 from the first position illustrated in FIGS. 10 and 13 towards a second position until the operation of the dispensing pump 34 is terminated by the control unit 44. It will be understood that the final position of the piston 102 in the chamber 20 at the end of the dispensing operation, for example as shown in FIG. 11, will be dependent upon the volume of flowable product that is delivered from the chamber 20 during operation of the dispensing pump 34.

The piston 102 includes a hollow piston rod 108 which is slidably received in a linear guide 110. The hollow piston rod 108 has inlet ports 112 at a first end and an outlet port 114 at a second end. The inlet and outlet ports 112, 114 enable flowable product to be conveyed from the chamber 20 and into the conduit 26 via the product outlet 24 during movement of the piston 102 towards the second position during the dispensing operation.

After the control unit 44 determines that the predetermined mass of flowable product has been delivered from the chamber 20 via the product outlet 24, the control unit 44 is arranged to control the operation of a vacuum pump 104 so that it applies a suction force to a surface 64 of the piston 102 opposite to the contact surface 48 to thereby move the piston 102 from its final position at the end of the dispensing operation (as shown by way of example in FIG. 11) to the first position illustrated in FIGS. 10 and 13. During movement of the piston 102 back to the first position and provided that there is sufficient flowable product inside the air-tight cavity 14 of a connected collapsible container 12 to completely re-fill the chamber 20, flowable product from the collapsible container 12 is drawn from the air-tight cavity 14 into the chamber 20 until the piston 102 reaches the first position and the chamber 20 is once again completely filled with flowable product.

Once the piston 102 reaches the first position, this is detected by a transducer 106, such as a limit switch or a micro switch, which is contacted by the piston 102 and a detection signal is transmitted to the control unit 44 by the transducer 106, causing the control unit 44 to cease operation of the vacuum pump 104 and to open a vent valve (not shown) to relieve pressure, and hence suction force, acting on the piston surface 64 and to allow it to vent to atmosphere. The detection signal transmitted by the transducer 106 to the control unit 44 indicates that the apparatus 100 is again ready for use to dispense further flowable product from the chamber 20 in the manner described above.

Figure 12:
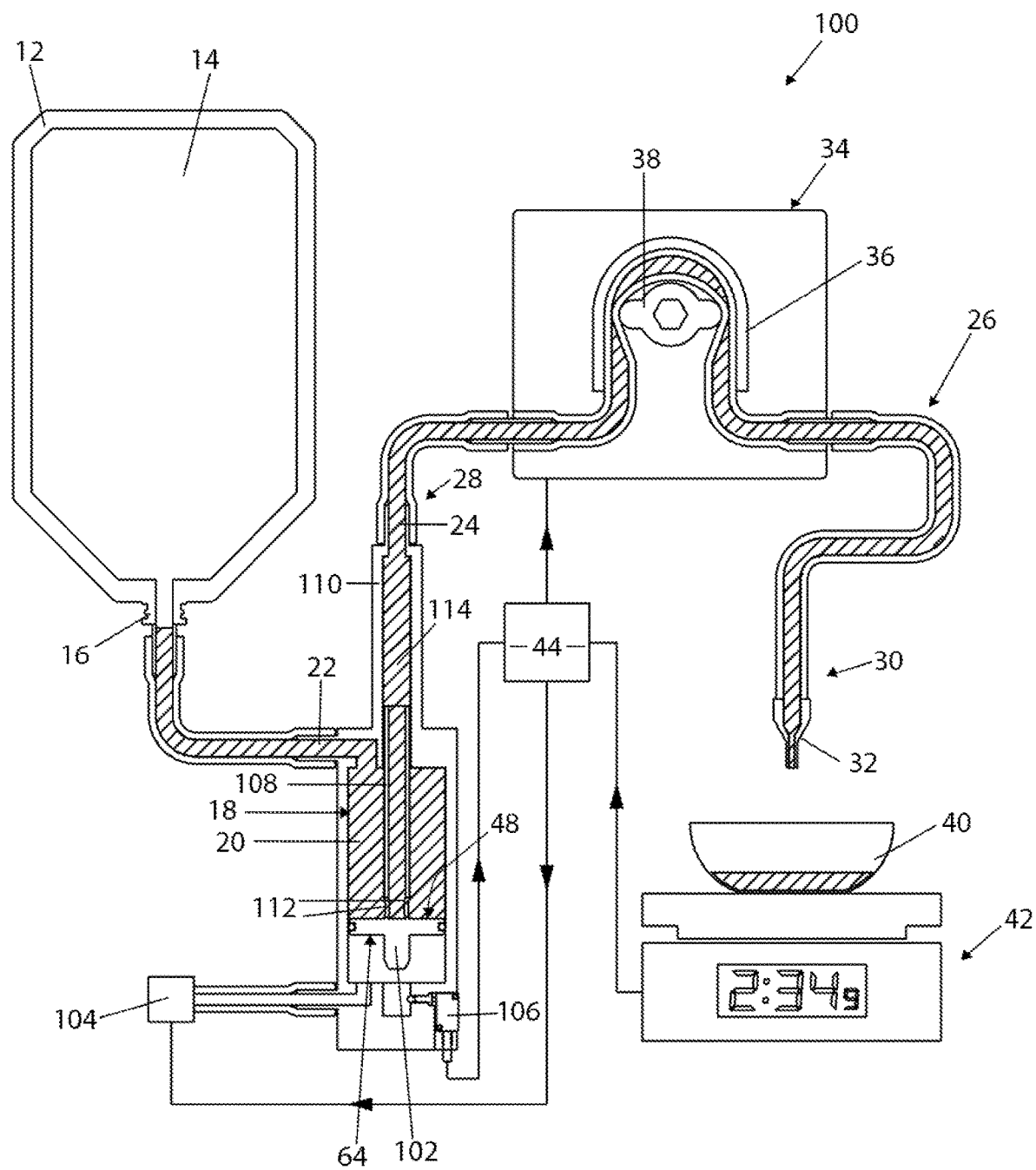
FIG. 12 is a diagrammatic view similar to FIGS. 10 and 11 showing the operation of the apparatus when the supply of flowable product in the connected collapsible container is fully depleted.

Referring now to FIG. 12, when the flowable product in the connected collapsible container 12 has been used up in prior dispensing operations and the air-tight cavity 14 is empty, a vacuum is generated and the pumping forces thereby increase. As a consequence, during operation of the vacuum pump 104 to move the piston 102 from its final position at the end of the dispensing operation (as shown by way of example in FIG. 11) to the first position, the pumping forces cannot be overcome by the vacuum pump 104 and the piston 102 cannot be returned by the vacuum pump 104 to the first position. This prevents piston 102 from contacting the transducer 106 and, thus, the transducer 106 cannot transmit a detection signal to the control unit 44. In the absence of the detection signal, the control unit 44 determines that the piston 102 has not returned to the first position and, therefore, that the connected collapsible container 12 is empty and that further flowable product cannot be dispensed. The control unit 44 then generates an alert, for example a visual and/or an audible alert, thereby prompting the user to disconnect the empty collapsible container 12 and to connect a replacement collapsible container 12 containing a fresh supply of flowable product.

After connection of a replacement collapsible container 12 containing a fresh supply of flowable product as illustrated in FIG. 13, the vacuum pump 104 can be operated by the control unit 44 to return the piston 102 to the first position to thereby refill the chamber 20 with flowable product and enable further dispensing operations to be performed in the manner described above.

FIGS. 14 to 17 illustrate a fifth embodiment of an apparatus 120 for dispensing a flowable product from a collapsible container 12 which is similar to the apparatus 70 shown in FIGS. 4 to 6 and in which corresponding components are identified using corresponding reference numerals.

The apparatus 120 comprises a reservoir 18 having a chamber 20 for receiving and storing flowable product delivered from the air-tight cavity 14 of the connected collapsible container 12. The chamber 20 includes a product inlet 22 which is connected to the opening 16 so that flowable product can be delivered into the chamber 20 from the air-tight cavity 14 of the collapsible container 12. The chamber 20 also includes a product outlet 24 through which flowable product can be delivered from the chamber 20 and into a conduit 26 having a first end 28 connected to the product outlet 24 and a second end 30 having a dispensing outlet 32.

The apparatus 120 comprises a piston 122 which is positioned inside the chamber 20 and which is movable linearly inside the chamber 20 to vary the internal volume of the chamber 20. The piston 122 is movable between a first position shown in FIGS. 14 and 17 which defines a maximum chamber volume and a second position which defines a minimum chamber volume. When the piston 122 is in the second position, the chamber 20 is substantially devoid of flowable product. As will be described in further detail below, movement of the piston 122 towards the second position dispenses flowable product from the chamber 20 via the product outlet 24 and occurs during a dispense cycle. Conversely, movement of the piston 122 towards the first position delivers flowable product from the air-tight cavity 14 of a connected collapsible container 12 into the chamber 20 to fill the chamber 20 with flowable product and occurs during a fill cycle.

The piston 102 includes a hollow piston rod 108 which is slidably received in a linear guide 110. The hollow piston rod 108 has inlet ports 112 at a first end and an outlet port 114 at a second end. The inlet and outlet ports 112, 114 enable flowable product to be conveyed from the chamber 20 and into the conduit 26 via the product outlet 24 during movement of the piston 102 towards the second position during the dispense cycle.

The apparatus 120 comprises a linear actuator 76 for controlling the movement of the piston 122 inside the chamber 20 between the first and second positions. In the illustrated embodiment, the linear actuator 76 comprises an electric motor 78, typically a stepper motor, and a leadscrew 80. The electric motor 78 and leadscrew 80 may be arranged in any suitable manner to convert rotational motion of the electric motor 78 into linear movement of the leadscrew 80. The leadscrew 80 may cooperate with a guide 81 to prevent rotation of the leadscrew 80.

Like the apparatus described above, the apparatus 120 includes a receptacle 40 into which flowable product is dispensed, a load cell 42 and a control unit 44. The apparatus 120 operates in a similar way to the apparatus 70 illustrated in FIGS. 4 to 6 to dispense a predetermined mass of flowable product into the receptacle 40 and the dispensing operation is controlled by the control unit 44 based on the load measurement signal received from the load cell 42.

The operation of the linear actuator 76, and hence the movement of the piston 122 between the first and second positions, is controlled by the control unit 44. During the fill cycle, the control unit 44 transmits a fill control signal to the linear actuator 76 to operate the linear actuator 76 and thereby move the piston 122 towards the first position, e.g. from the second position or from a position intermediate the first and second positions, to thereby deliver flowable product from the air-tight cavity 14 of a connected collapsible container 12 into the chamber 20. During the dispense cycle, the control unit 44 transmits a dispense control signal to the linear actuator 76 to operate the linear actuator 76 and thereby move the piston 122 towards the second position to thereby convey flowable product from the chamber 20 via the product outlet 24.

The apparatus 120 comprises an inlet valve 124 positioned upstream of the product inlet 22. The inlet valve 124 comprises an electromechanical valve, for example a solenoid valve, which can be commanded by the control unit 44 to move between an open position and a closed position. The inlet valve 124 is commanded by the control unit 44 to adopt the open position during movement of the piston 122 towards the first position, thereby allowing flowable product to be delivered from the air-tight cavity 14 of a connected collapsible container 12 into the chamber 20 during the fill cycle. The inlet valve 124 is commanded by the control unit 44 to adopt the closed position during movement of the piston 122 towards the second position. Thus, when the piston 122 is being moved by the linear actuator 76 towards the second position during the dispense cycle to convey flowable product from the chamber 20 via the product outlet 24, the closed position of the inlet valve 124 prevents the flowable product from flowing back into the air-tight cavity 14 of a connected collapsible container 12.

The apparatus 120 also comprises an outlet valve 126 positioned downstream of the product outlet 24. The outlet valve 126 comprises an electromechanical valve, for example a solenoid valve, which can be commanded by the control unit 44 to move between an open position and a closed position. The outlet valve 126 is commanded by the control unit 44 to adopt the closed position during movement of the piston 122 towards the first position, thereby ensuring that only flowable product from the air-tight cavity 14 of a connected collapsible container 12 is delivered to the chamber 20 during the fill cycle to thereby re-fill the chamber 20. The outlet valve 126 is commanded by the control unit 44 to adopt the open position during movement of the piston 122 towards the second position, thereby enabling flowable product to be conveyed from the chamber 20 via the product outlet 24 during the dispense cycle.

Figure 14:
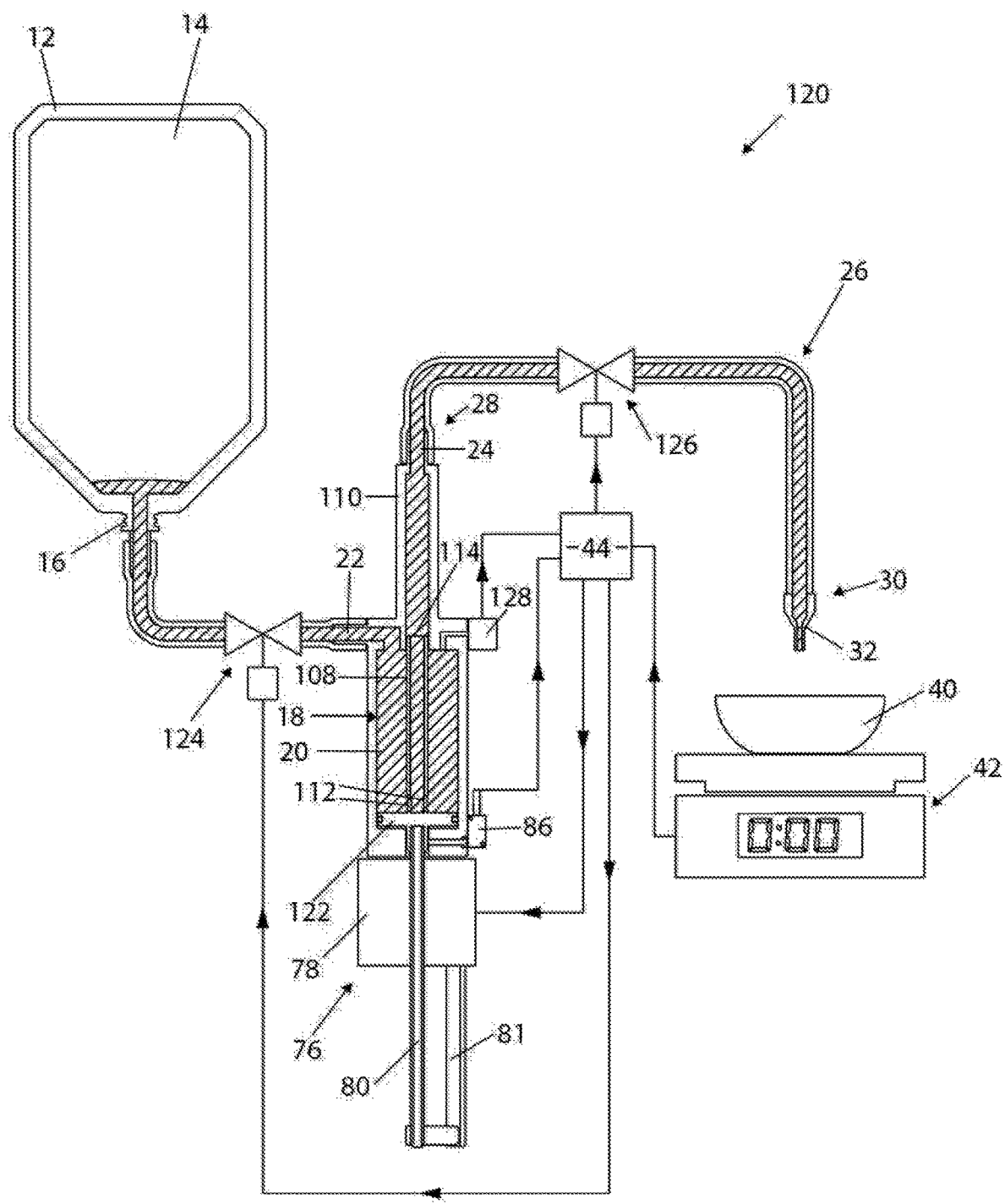
FIGS. 14 and 15 are diagrammatic views of a fifth embodiment of an apparatus for dispensing a flowable product showing the operation of the apparatus when connected to a collapsible container containing flowable product.
Figure 15:
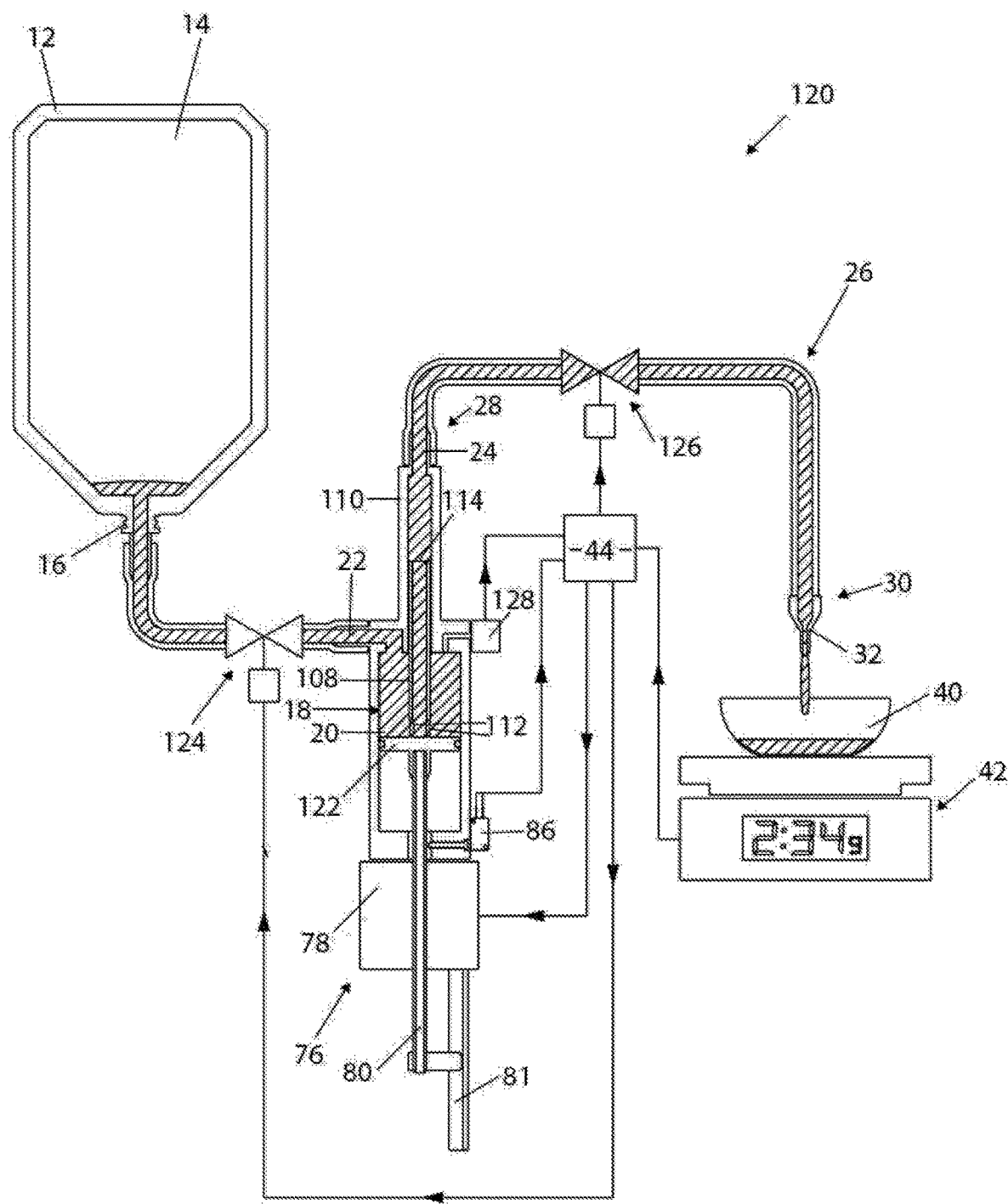
Figure 16:
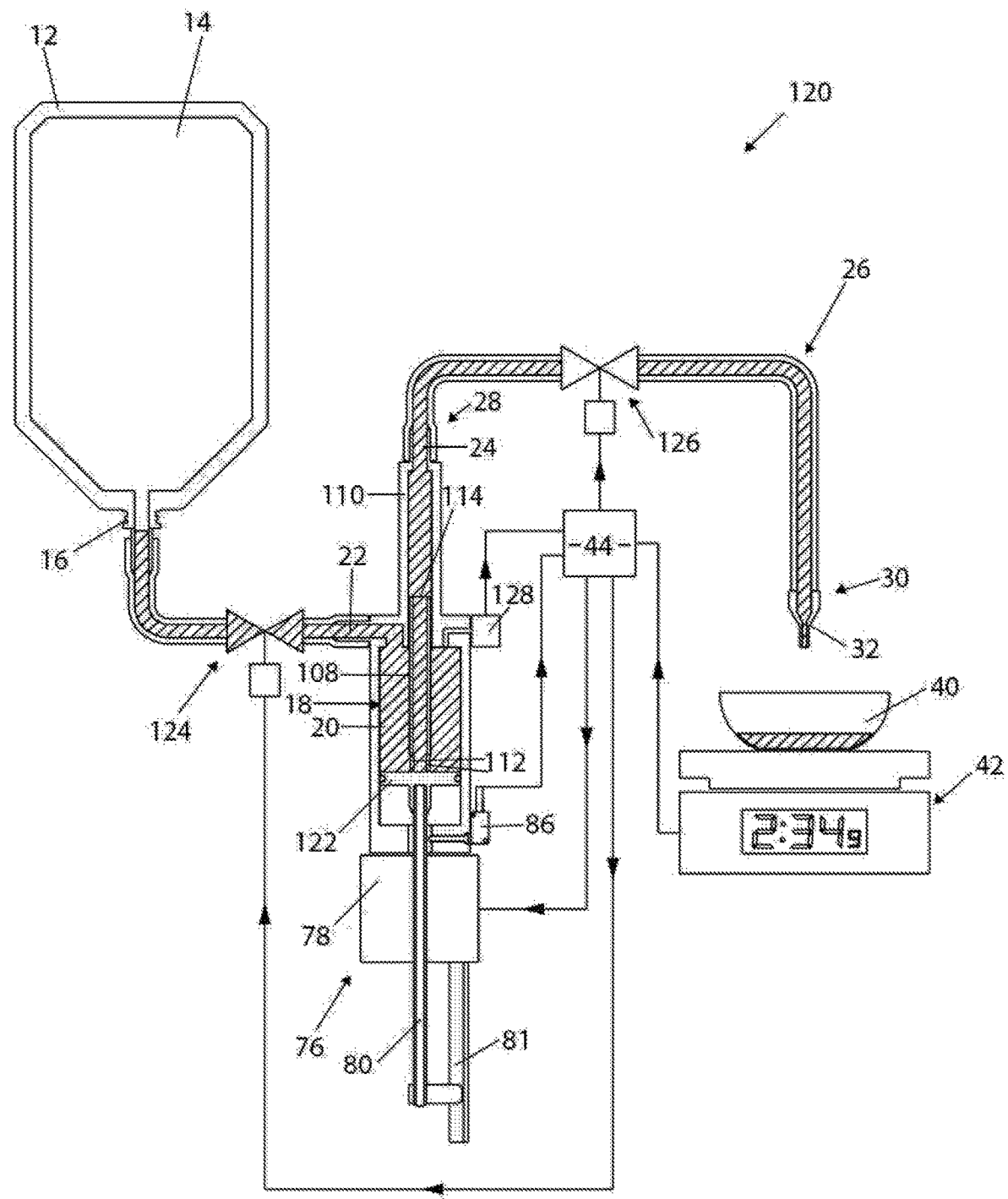
FIG. 16 is a diagrammatic view similar to FIGS. 14 and 15 showing the operation of the apparatus when the supply of flowable product in the connected collapsible container is fully depleted.
Figure 17:
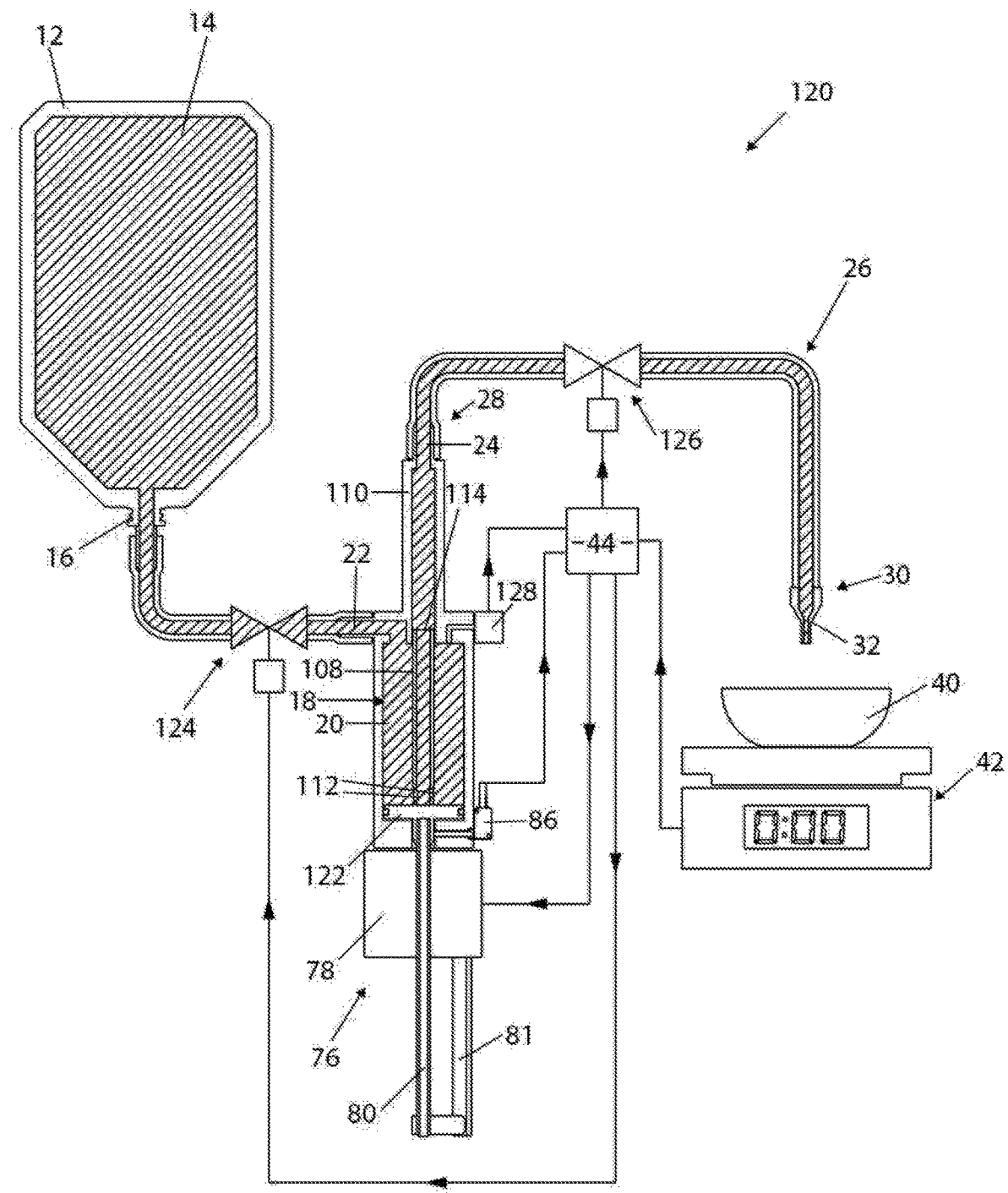
FIG. 17 is a view similar to FIG. 16 showing the operation of the apparatus after connection of a replacement collapsible container containing flowable product.

The apparatus 120 is shown in FIGS. 14 and 17 in a primed state in which the piston 122 is in the first position and the chamber volume is at its maximum. In this primed state, the chamber 20 is filled with flowable product from the air-tight cavity 14 of a connected collapsible container 12 by implementing the fill cycle described above. The apparatus 120 comprises a detector 86, for example in the form of a limit switch or a micro switch, which detects when the piston 122 is in the first position and sends a detection signal to the control unit 44. Upon receipt of the detection signal, the control unit 44 terminates the operation of the linear actuator 76, for example by interrupting the electrical supply to the electric motor 78, to retain the piston 122 in the first position. In the illustrated embodiment, part of the piston 122 contacts the detector 86 when the piston 122 is in the first position, but it will be understood that other arrangements are possible.

When the control unit 44 receives a control signal indicating that a desired mass flowable product needs to be dispensed into the receptacle 40, the control unit 44 initiates the dispense cycle by commanding the inlet valve 124 to move to the closed position and commanding the outlet valve 126 to move to the open position (if not already in these positions) and by controlling the electric motor 78 to rotate the leadscrew 80 and thereby move the piston 122 inside the chamber 20 towards the second position. As soon as the control unit 44 determines that the dispense cycle is complete based on the load measurement signal received from the load cell 42, the control unit 44 initiates the fill cycle by commanding the inlet valve 124 to move to the open position and commanding the outlet valve 126 to move to the closed position and by controlling the electric motor 78 to rotate the leadscrew 80 in the opposite direction and thereby move the piston 122 inside the chamber 20 from its position at the end of the dispense cycle back to the first position shown in FIGS. 14 and 17. Once the piston 122 has returned to the first position, this is detected by the detector 86 and the control unit 44 interrupts the electrical supply to the electric motor 78 upon receipt of the detection signal, to thereby terminate the fill cycle and retain the piston 122 in the first position. Thus, the apparatus 120 is returned once again to the primed state.

The fill cycle can be executed by the control unit 44 in the manner described above, to return the piston 122 to the first position, provided that there is sufficient flowable product inside the air-tight cavity 14 of a connected collapsible container 12 to completely re-fill the chamber 20. In the event that the flowable product inside the air-tight cavity 14 becomes fully depleted because it has been consumed in one or more preceding dispense cycles, a vacuum is generated and the chamber 20 becomes pressurised as the piston 122 is moved by the linear actuator 76 towards the first position. The increase in pressure inside the chamber 20, for example in the order of 0.3 to 0.4 bar, is detected by a pressure transducer 128, for example a pressure switch, and a pressure signal is transmitted to the control unit 44 by the pressure transducer 128. The increase in pressure is indicative of the fact that the supply of flowable product in the air-tight cavity 14 of a connected collapsible container 12 is depleted and that a replacement collapsible container 12 needs to be connected to the apparatus 120.

Upon receiving the pressure signal from the pressure transducer 128, the control unit 44 generates a visual and/or an audible alert which notifies a user that the connected collapsible container 12 is empty and thereby prompts the user to connect a replacement collapsible container 12 containing a further supply of flowable product. The control unit 44 may also interrupt the electrical supply to the electric motor 78 upon receiving the pressure signal from the pressure transducer 128, to thereby disable the electric motor 78.

It is envisaged that the increase in pressure inside the chamber 20 may prevent the piston 122 from being moved by the linear actuator 76 to the first position. In this case, the piston 122 is prevented from contacting the detector 86 and the detector 86 is, thus, unable to transmit the detection signal to the control unit 44. The absence of receipt of the detection signal by the controller 44 may provide further confirmation, in addition to the receipt of the pressure signal from the pressure transducer 128, that the connected collapsible container 12 is empty and requires replacement.

After connection of a replacement collapsible container 12 containing a fresh supply of flowable product as illustrated in FIG. 17, it will be understood that the liner actuator 76 can be operated by the control unit 44 to return the piston 122 to the first position to thereby refill the chamber 20 with flowable product and enable further dispense cycles to be performed in the manner described above.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Each feature disclosed in the specification, including the claims and drawings, may be replaced by alternative features serving the same, equivalent or similar purposes, unless expressly stated otherwise.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. An apparatus for dispensing a flowable product from a collapsible container comprising an air-tight cavity and an opening, the apparatus comprising:
   a reservoir comprising a chamber for storing flowable product, the chamber comprising: a product inlet for receiving flowable product delivered from the air-tight cavity of a connected collapsible container through the opening thereof; and a product outlet for the flowable product;
   a piston positioned inside the chamber which is movable to vary the volume of the chamber; and
   a dispensing pump for conveying the flowable product from the product outlet,
   wherein, during operation of the dispensing pump, a suction force is applied to a contact surface of the piston in contact with the flowable product inside the chamber, wherein the suction force is arranged to move the piston from the first position towards the second position during dispensing of flowable product from the chamber.

2. The apparatus of claim 1, wherein the piston is movable between a first position defining a maximum chamber volume and a second position defining a minimum chamber volume.

3. The apparatus of claim 2, wherein the apparatus is arranged to deliver flowable product into the chamber from the air-tight cavity of a connected collapsible container during movement of the piston towards the first position.

4. The apparatus of claim 2, wherein the apparatus is arranged to dispense flowable product from the chamber via the product outlet during movement of the piston from the first position towards the second position.

5. The apparatus of claim 1, further comprising a control unit, wherein the control unit is arranged to monitor a characteristic associated with the movement of the piston and to recognise when the monitored characteristic indicates that flowable product is not available for delivery to the chamber from the air-tight cavity of a connected collapsible container.

6. The apparatus of claim 5, wherein the control unit is arranged to generate an alert upon recognising that the monitored characteristic indicates that flowable product is not available for delivery to the chamber from the air-tight cavity of a connected collapsible container.

7. The apparatus of claim 5, wherein the piston is movable between a first position defining a maximum chamber volume and a second position defining a minimum chamber volume, the apparatus comprises a transducer arranged to detect when the piston is in the first position and the control unit is arranged to monitor the movement of the piston based on a detection signal received by the control unit from the transducer.

8. The apparatus of claim 7, wherein the detection signal is indicative of movement of the piston from the first position towards the second position or indicates that the piston is in the first position.

9. The apparatus of claim 1, further comprising a vacuum pump selectively operable to move the piston towards a first position defining a maximum chamber volume.

10. The apparatus of claim 9, wherein:
    the piston is movable between the first position defining the maximum chamber volume and a second position defining a minimum chamber volume;
    the vacuum pump is selectively operable to move the piston from the second position to the first position; and
    wherein the apparatus further comprises:
    a control unit;
    a further transducer arranged to detect when the piston is in the second position and to transmit a detection signal to the control unit;
    the control unit being arranged to control the operation of the vacuum pump to move the piston from the second position to the first position upon receiving the detection signal from the further transducer.

11. The apparatus of claim 1, wherein the apparatus comprises a retainer arranged to retain the piston in the first position when the suction force is less than, or equal to, a predetermined retaining force.

12. The apparatus of claim 11, wherein the piston is movable between a first position defining a maximum chamber volume and a second position defining a minimum chamber volume and the retainer is arranged to release the piston and allow movement of the piston from the first position towards the second position when the suction force is greater than the predetermined retaining force.

13. The apparatus of claim 11, wherein the retainer comprises a magnet assembly.

14. The apparatus of claim 13, wherein the magnet assembly comprises first and second magnets having opposite polarities.

15. The apparatus of claim 1, wherein the apparatus comprises a conduit having a first end connected to the product outlet and a second end through which the flowable product is dispensed.

16. The apparatus of claim 15, wherein a dispensing outlet is provided at the second end of the conduit.

17. The apparatus of claim 15, wherein the apparatus comprises a dispensing pump for conveying the flowable product from the product outlet and the dispensing pump is arranged to convey the flowable product along the conduit from the first end to the second end.

18. An apparatus for dispensing a flowable product from a collapsible container comprising an air-tight cavity and an opening, the apparatus comprising:
    a reservoir comprising a chamber for storing flowable product, the chamber comprising: a product inlet for receiving flowable product delivered from the air-tight cavity of a connected collapsible container through the opening thereof; and a product outlet for the flowable product;
    a piston positioned inside the chamber which is movable to vary the volume of the chamber; and
    a control unit, wherein the control unit is arranged to monitor a characteristic associated with the movement of the piston and to recognise when the monitored characteristic indicates that flowable product is not available for delivery to the chamber from the air-tight cavity of a connected collapsible container.

19. An apparatus for dispensing a flowable product from a collapsible container comprising an air-tight cavity and an opening, the apparatus comprising:
- a reservoir comprising a chamber for storing flowable product, the chamber comprising: a product inlet for receiving flowable product delivered from the air-tight cavity of a connected collapsible container through the opening thereof; and a product outlet for the flowable product;
- a piston positioned inside the chamber which is movable to vary the volume of the chamber;
- a dispensing pump for conveying the flowable product from the product outlet, wherein, during operation of the dispensing pump, a suction force is applied to a contact surface of the piston in contact with the flowable product inside the chamber; and
- a retainer arranged to retain the piston in the first position when the suction force is less than, or equal to, a predetermined retaining force.

\* \* \* \* \*